United States Patent

Hiroshi et al.

[11] 4,377,325
[45] Mar. 22, 1983

[54] BRIGHT AND COMPACT OPTICAL-COMPENSATION TYPE ZOOM LENS SYSTEM

[75] Inventors: Takase Hiroshi, Hachioji; Tadashi Kimura, Tokyo, both of Japan

[73] Assignee: Olympus Optical Co., Ltd., Tokyo, Japan

[21] Appl. No.: 235,429

[22] Filed: Feb. 17, 1981

[30] Foreign Application Priority Data

Feb. 18, 1980 [JP] Japan .................................. 55-18849

[51] Int. Cl.³ .......................................... G02B 15/14
[52] U.S. Cl. ..................................................... 350/423
[58] Field of Search ................................. 350/425, 423

[56] References Cited

U.S. PATENT DOCUMENTS 3,051,052  8/1962  Bergstein .
4,232,942  11/1980  Ikemori ............................. 350/423

FOREIGN PATENT DOCUMENTS 53-142251  12/1978  Japan .

Primary Examiner—John K. Corbin
Assistant Examiner—Rebecca D. Gass
Attorney, Agent, or Firm—Cushman, Darby & Cushman

[57] ABSTRACT

A bright and compact optical-compensation type zoom lens system comprising a first lens group I having positive refractive power, a second lens group II having negative refractive power, a third lens group III having positive refractive power, and a fourth lens group IV having positive refractive power, the zoom lens system being arranged to carry out zooming by keeping the lens groups II and IV fixed and moving the lens groups I and III, the zoom lens system being arranged so that the focal length in the tele-position is long and, moreover, the quality of image is good.

25 Claims, 24 Drawing Figures

BRIGHT AND COMPACT OPTICAL-COMPENSATION TYPE ZOOM LENS SYSTEM

BACKGROUND OF THE INVENTION (a) Field of the Invention

The present invention relates to a bright and compact optical-compensation type zoom lens system.

(b) Description of the Prior Art

As for most of optical-compensation type zoom lens systems of medium telephoto class (with focal lengths about 100 mm to 200 mm) which are commercially available at present, the aperture ratios are large and overall lengths of lens systems are also large. Among known optical-compensation type zoom lens systems, there are such lens systems of which the aperture ratios are small and which are designed compactly. However, their qualities of images are not good. Out of known lens systems, the zoom lens system disclosed in the Japanese Published Unexamined Patent Application No. 142,251/78 has a small aperture ratio and favourably corrected aberrations. However, its focal length in the tele-position in not long.

SUMMARY OF THE INVENTION

It is, therefore, a primary object of the present invention to provide a bright and compact optical-compensation type zoom lens system for which the focal length in the tele-position is long and, moreover, the quality of image is good.

The zoom lens system according to the present invention has the basic lens configuration as shown in FIG. 1. That is, the zoom lens system according to the present invention comprises a first lens group I having positive refractive power, a second lens group II having negative refractive power, a third lens group III having positive refractive power, and a fourth lens group IV having positive refractive power, the zoom lens system being an optical-compensation type zoom lens system arranged to carry out zooming by keeping the second lens group II and fourth lens group IV fixed and moving the first lens group I and third lens group III in the same moving direction by the same amount of movement. Besides, the first lens group I comprises a cemented doublet consisting of a positive lens element and negative lens element, the second lens group II comprises at least one positive lens element and at least one negative lens element and comprises a cemented doublet, which consists of a positive lens element and negative lens element and of which the surface on the object side is concave toward the object side, the third lens group III comprises a cemented doublet consisting of a positive lens element and negative lens element, and the fourth lens group IV comprises at least one positive lens and at least one negative lens. In other words, the zoom lens system according to the present invention has lens configurations as shown in FIGS. 3, 4 and 5. The lens system having the lens configuration shown in FIG. 3 is arranged so that the first lens group I comprises a cemented doublet consisting of a positive lens element and negative lens element and having positive refractive power, the second lens group II comprises a negative single lens and cemented doublet, which consists of a negative lens element and positive lens element and has a concave surface on the object side, and the second lens group II as a whole has negative refractive power, the third lens group III comprises a cemented doublet consisting of a negative lens element and positive lens element and having positive refractive power, and the fourth lens group IV comprises a positive lens, negative lens and positive lens and has positive refractive power. The lens system having the lens configuration shown in FIG. 4 is arranged so that the first lens group I comprises a cemented doublet consisting of a positive lens element and negative lens element, the second lens group II comprises a cemented doublet consisting of a negative lens element and positive lens element, the third lens group III comprises a cemented doublet consisting of a negative lens element and positive lens element, and the fourth lens group IV comprises three lenses, i.e., a positive lens, negative lens and positive lens. The lens system having the lens configuration shown in FIG. 5 is arranged so that the first lens group I comprises a cemented doublet consisting of a positive lens element and negative lens element, the second lens group II comprises a cemented doublet consisting of a negative lens element and positive lens element, the third lens group III comprises a cemented doublet consisting of a negative lens element and positive lens element, and the fourth lens group IV comprises two lenses, i.e., a positive lens and negative lens. Besides, the zoom lens system according to the present invention is arranged to satisfy the following conditions.

$$0.5F_W < |F_{II}| < 1.0F_W \quad (1)$$

$$0.6F_W < F_{III} < 1.5F_W \quad (2)$$

$$0.6F_W < r_{I-1} < 2.0F_W \quad (3)$$

$$0.4F_W < |r_{II}| < 1.2F_W \quad (4)$$

$$\Delta N_{II} + \Delta N_{III} \leq 0.4 \quad (5)$$

$$\Delta v_I > 15 \quad (6)$$

In the above-mentioned conditions, reference symbol $F_W$ represents the shortest focal length of the lens system as a whole, reference symbol $F_{II}$ represents the focal length of the second lens group II, reference symbol $F_{III}$ represents the focal length of the third lens group III, reference symbol $r_{I-1}$ represents the radius of curvature of the surface on the object side of the first lens group I, reference symbol $r_{II}$ represents the radius of curvature of the surface on the object side of the cemented doublet constituting the second lens group II, reference symbol $\Delta \overline{N}_{II}$ represents the difference $\overline{N'}_{II} - \overline{N''}_{II}$ between the mean value $\overline{N'}_{II}$ of refractive indices of positive lenses constituting the second lens group II and mean value $\overline{N''}_{II}$ of refractive indices of negative lenses constituting the second lens group II, reference symbol $\Delta \overline{N}_{III}$ represents the difference $\overline{N''}_{III} - \overline{N'}_{III}$ between the mean value $\overline{N''}_{III}$ of refractive indices of negative lenses constituting the third lens group III and mean value $\overline{N'}_{III}$ of refractive indices of positive lenses constituting the third lens group III, and reference symbol $\Delta v_I$ represents the value $v'_I - v''_I$ obtained by subtracting the Abbe's number $v''_I$ of the negative lens constituting the first lens group I from the Abbe's number $v'_I$ of the positive lens constituting the first lens group I.

For an optical-compensation type zoom lens system, power distribution for respective lens groups should be decided so that the movement of focusing surface at the time of zooming is carried out within an allowable range which is determined by the depth of focus. At that time, it is desirable that the focusing surface comes to the same position at three points in the zooming range and this depends on power distribution in the second lens group II and third lens group III. The conditions (1) and (2) are established for the above-mentioned purpose. That is, when $F_{II}$ or $F_{III}$ becomes larger than the upper limit of the condition (1) or (2) when it is so arranged that the amount of movement of the focusing surface is kept within a predetermined range, the amount of lens movement at the time of zooming becomes too large and it becomes difficult to provide the space required for lens movement within the lens barrel. Moreover, it becomes difficult to make the lens system compact. If $F_{II}$ or $F_{III}$ becomes smaller than the lower limit of the condition (1) or (2), aberrations will be aggravated and it becomes difficult to correct them favourably.

Referring to FIGS. 2A and 2B, the position of the shortest focal length is shown in FIG. 2A and the position of the longest focal length is shown in FIG. 2B. In the position of the shortest focal length (FIG. 2A), the height of incidence of paraxial ray upon each lens group is represented by reference symbol $h_{iW}$ (i=I, II or III), and the height of incidence of paraxial principal ray upon each lens group is represented by reference symbol $\bar{h}_{iW}$. In the position of the longest focal length (FIG. 2B), the height of incidence of paraxial ray upon each lens group is represented by reference symbol $h_{iT}$, and the height of incidence of paraxial principal ray upon each lens group is represented by reference symbol $\bar{h}_{iT}$. When the height of incidence of paraxial ray is larger, spherical aberration caused at the refractive surface becomes larger. As, however, the heights of incidence of rays have the relation of $h_{IW}$, $h_{IIW} < h_{IIIW}$ and relation of $h_{IIT}$, $h_{IIIT} < h_{IT}$, spherical aberration in the position of the longest focal length might remain in the undercorrected state even when spherical aberration is favourably corrected in the position of the shortest focal length only. Moreover, as there is the relation of $h_{IT} > h_{IIT}$, $h_{IIIT}$, $h_{IW}$, $h_{IIW}$, $h_{IIIW}$, under-corrected spherical aberration tends to become large especially in the position of the longest focal length. To make under-corrected spherical aberration in the position of the longest focal length small, the radius of curvature of the first surface should be made large. On the other hand, when it is tried to correct the above-mentioned spherical aberration not by the first surface but by making the radius of curvature of the surface on the object side on the cemented doublet in the second lens group II small, the refractive angle of the principal ray at the above-mentioned surface becomes large. As there is the relation of $\bar{h}_{IIW} > \bar{h}_{IIIW}$, it becomes difficult to correct the above-mentioned refractive angle by the third lens group III, in the position of the shortest focal length, and barrel-type distortion occurs as a result. When it is supposed here that the value of the refractive angle of the principal ray is within the range of values to be treated by the paraxial theory, the refractive angle can be expressed by $\bar{h}\phi$ where reference symbol $\phi$ represents the refractive power of refractive surface. To keep distortion in the favourably corrected state, it is essential that the sum of refractive angles in the lens system as a whole, i.e., the sum $\Sigma \bar{h}\phi$ of refractive angles at respective surfaces in the lens system, is arranged as a value within a certain range as it is pointed out by Berek. When it is tried to make the barrel-type distortion caused in the position of the shortest focal length small by making the radius of curvature of the surface on the object side of the cemented doublet in the second lens group II large, another aberration related to the principal ray, i.e., astigmatism, causes a difference between values of astigmatism to be caused at both ends of zooming state (in the wide position and tele-position) because there is the relations of $\bar{h}_{IIW} > \bar{h}_{IIIW}$ and $\bar{h}_{IIT} \approx \bar{h}_{IIIT}$. Consequently, even when the astigmatic difference at one end of zooming state is corrected favourably, it becomes difficult to favourably correct the astigmatic difference at the other end of zooming state.

When the above points are in the adequate state, influence of cemented surfaces in the second lens group II and third lens group III on aberrations becomes important. When the differences between the refractive indices of lens elements on both sides of those cemented surfaces are made too large, it becomes necessary to make the radii of curvature of cemented surfaces large in order to correct spherical aberration. In that case, however, coma and astigmatism become unfavourable.

As for chromatic aberration, it is preferable to make all lens groups respectively achromatic. However, to correct longitudinal chromatic aberration and lateral chromatic aberration in the well balanced state, it is not always essential to make all lens groups respectively achromatic. As, however, chromatic aberration to be caused by the first lens group I is large, the first lens group should be made achromatic to a certain degree because this is required for correcting longitudinal chromatic aberration and lateral chromatic aberration in the well balanced state by means of the lens groups II, III and IV.

The conditions (3) through (6) are established by taking the above-mentioned points into consideration.

If, in the condition (3), $r_{I-1}$ becomes smaller than the lower limit, spherical aberration will be undercorrected. If $r_{I-1}$ becomes larger than the upper limit of the condition (3), asymmetry of coma increases remarkably and it becomes difficult to correct it.

If, in the condition (4), $r_{II}$ becomes smaller than the lower limit, spherical aberration will be overcorrected and, moreover, barrel type distortion becomes large at the position of the shortest focal length. If $r_{II}$ becomes larger than the upper limit of the condition (4), the astigmatic difference becomes large and it becomes difficult to correct it.

If, in the condition (5), $\Delta \bar{N}_{II} + \Delta \bar{N}_{III}$ becomes larger than the upper limit, influence of cemented surfaces on aberrations becomes strong and, consequently, aberrations become unbalanced.

To make spherical aberration and astigmatism well balanced with each other when the conditions (4) and (5) are satisfied, it is preferable to select radii of curvature $r_{III-1}$ and $r_{III-2}$ of the surface on the object side and cemented surface of the cemented doublet in the third lens group III so that they satisfy the condition (7) shown below.

$$0.6 < |r_{III-1}r/III-2| < 2.5 \tag{7}$$

If, in the condition (6), $\Delta \nu_I$ becomes smaller than the lower limit, it becomes difficult to correct chromatic aberration favourably in all states of zooming.

For correction of chromatic aberration, it is more preferable to select the radius of curvature $R_{I-2}$ of the cemented surface of the cemented doublet in the first lens group I so that it satisfies the following condition (8) when the above-mentioned condition (6) is satisfied.

$$|r_{I-2}| > 0.4 F_W \tag{8}$$

When it is so arranged that the above-mentioned conditions are respectively satisfied, it is possible to obtain a zoom lens system with high performance. Besides, to correct curvature of field more favourably by making Petzval's sum an adequate value, it is preferable to further satisfy the condition (9) shown below wherein reference symbol $\overline{N}_{IV}$ represents the mean value of refractive indices of respective lenses constituting the fourth lens group IV.

$$\overline{N}_{IV} > 1.5 \tag{9}$$

When $\overline{N}_{IV}$ becomes smaller than 1.5, the image surface will curve toward the object side and it becomes difficult to correct curvature of field favourably.

Moreover, when the following condition (10) is further satisfied, correction of Petzval's sum becomes comparatively easy and balance of aberrations becomes more favourable.

$$\overline{N}_I > 1.5 \tag{10}$$

In the above condition (10), reference symbol $\overline{N}_I$ represents the mean value of refractive indices of respective lenses constituting the first lens group I.

DETAILED DESCRIPTION OF THE PREFERRED EMBODIMENTS

Figure 1:
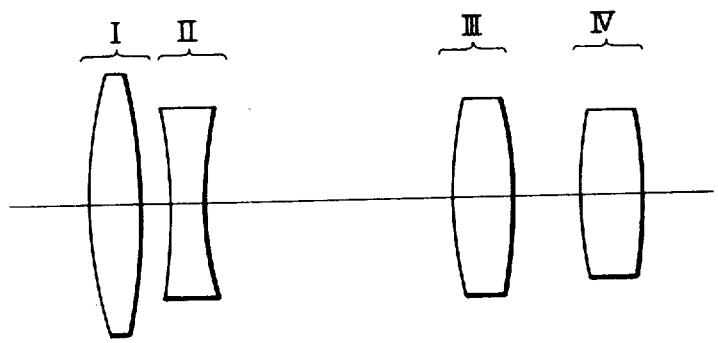
FIG. 1 illustrates the basic lens configuration of the zoom lens system according to the present invention.
Figure 2A:
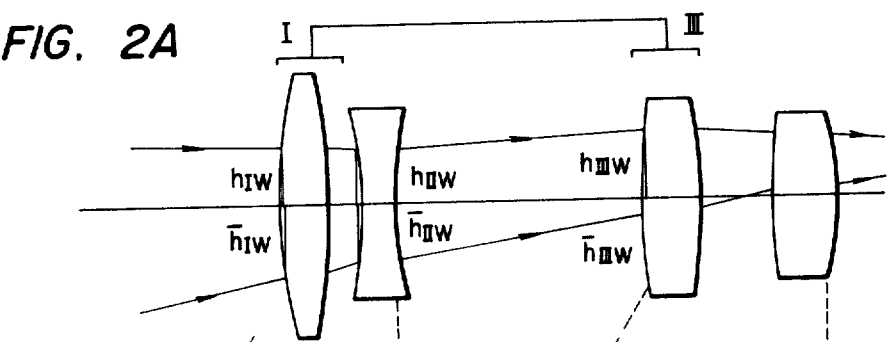
FIG. 2A illustrates the heights of incidence of paraxial ray and principal ray upon respective lens groups of the zoom lens system according to the present invention at the position of the shortest focal length.
Figure 2B:
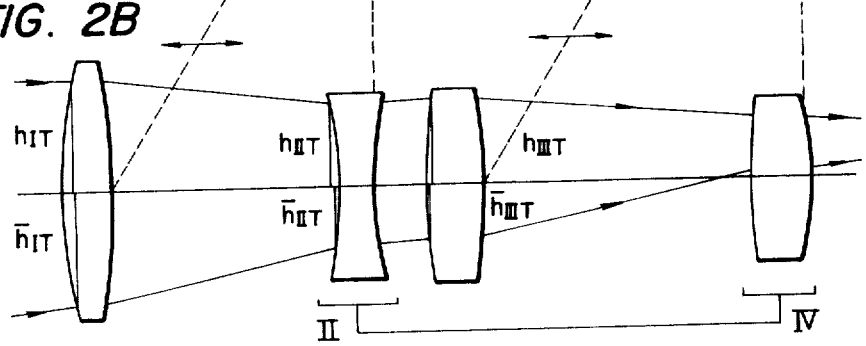
FIG. 2B illustrates the heights of incidence of paraxial ray and principal ray upon respective lens groups of the zoom lens system according to the present invention at the position of the longest focal length.

Preferred embodiments of the zoom lens system according to the present invention described in the above are as shown below.

| Embodiment 1 | | | |
|---|---|---|---|
| $r_1 = 106.068$ | | | |
| $d_1 = 8.16$ | $n_1 = 1.63854$ | $v_1 = 55.4$ | |
| $r_2 = -89.917$ | | | |
| $d_2 = 2.56$ | $n_2 = 1.6398$ | $v_2 = 34.5$ | |
| $r_3 = 430.595$ | | | |
| $d_3 = D_1$ (variable) | | | |
| $r_4 = 630.592$ | | | |
| $d_4 = 1.58$ | $n_3 = 1.47069$ | $v_3 = 67.4$ | |
| $r_5 = 53.66$ | | | |
| $d_5 = 5.28$ | | | |
| $r_6 = -51.723$ | | | |
| $d_6 = 1.49$ | $n_4 = 1.56873$ | $v_4 = 63.2$ | |
| $r_7 = 57.981$ | | | |
| $d_7 = 6.4$ | $n_5 = 1.64769$ | $v_5 = 33.8$ | |
| $r_8 = -167.369$ | | | |
| $d_8 = D_2$ (variable) | | | |
| $r_9 = 97.414$ | | | |
| $d_9 = 1.51$ | $n_6 = 1.80518$ | $v_6 = 25.4$ | |
| $r_{10} = 42.127$ | | | |
| $d_{10} = 7.99$ | $n_7 = 1.64328$ | $v_7 = 47.9$ | |
| $r_{11} = -90.745$ | | | |
| $d_{11} = D_3$ (variable) | | | |
| $r_{12} = 53.361$ | | | |
| $d_{12} = 3.89$ | $n_8 = 1.617$ | $v_8 = 62.8$ | |
| $r_{13} = 2063.483$ | | | |
| $d_{13} = 5.93$ | | | |
| $r_{14} = -72.391$ | | | |
| $d_{14} = 2.09$ | $n_9 = 1.56732$ | $v_9 = 42.8$ | |
| $r_{15} = 59.667$ | | | |
| $d_{15} = 7.4$ | | | |
| $r_{16} = -75.87$ | | | |
| $d_{16} = 5.74$ | $n_{10} = 1.6516$ | $v_{10} = 58.7$ | |
| $r_{17} = -43.246$ | | | |
| F | $D_1$ | $D_2$ | $D_3$ |
| 102.57 | 5.616 | 37.409 | 6.759 |
| 147.62 | 26.691 | 16.335 | 27.833 |
| 193 | 41.826 | 1.199 | 42.968 |
| $F_{II} = -0.714 F_W$ | | $F_{III} = 0.86 F_W$ | |
| $r_{I-1} = 1.034 F_W$ | | $|r_{II}| = 0.504 F_W$ | |
| $\Delta \overline{N}_{II} + \Delta \overline{N}_{III} = 0.28988$ | | $\Delta v_I = 20.9$ | |

| Embodiment 2 | | | |
|---|---|---|---|
| $r_1 = 105.22$ | | | |
| $d_1 = 8.27$ | $n_1 = 1.6935$ | $v_1 = 53.2$ | |
| $r_2 = -116.871$ | | | |
| $d_2 = 2.56$ | $n_2 = 1.6727$ | $v_2 = 32.1$ | |
| $r_3 = 294.901$ | | | |
| $d_3 = D_1$ (variable) | | | |
| $r_4 = 459.551$ | | | |
| $d_4 = 1.58$ | $n_3 = 1.47069$ | $v_3 = 67.4$ | |
| $r_5 = 55.4$ | | | |
| $d_5 = 5.29$ | | | |
| $r_6 = -49.782$ | | | |
| $d_6 = 1.49$ | $n_4 = 1.56873$ | $v_4 = 63.2$ | |
| $r_7 = 68.045$ | | | |
| $d_7 = 6.33$ | $n_5 = 1.6398$ | $v_5 = 34.5$ | |
| $r_8 = -157.932$ | | | |
| $d_8 = D_2$ (variable) | | | |
| $r_9 = 100.383$ | | | |
| $d_9 = 1.51$ | $n_6 = 1.80518$ | $v_6 = 25.4$ | |
| $r_{10} = 45.145$ | | | |
| $d_{10} = 8.13$ | $n_7 = 1.64328$ | $v_7 = 47.9$ | |
| $r_{11} = -90.856$ | | | |
| $d_{11} = D_3$ (variable) | | | |
| $r_{12} = 51.818$ | | | |
| $d_{12} = 4.54$ | $n_8 = 1.6935$ | $v_8 = 53.2$ | |
| $r_{13} = 127.254$ | | | |
| $d_{13} = 7.1$ | | | |
| $r_{14} = -283.406$ | | | |
| $d_{14} = 2.78$ | $n_9 = 1.59551$ | $v_9 = 39.2$ | |
| $r_{15} = 53.47$ | | | |
| $d_{15} = 8.59$ | | | |
| $r_{16} = 361.809$ | | | |
| $d_{16} = 6.61$ | $n_{10} = 1.6935$ | $v_{10} = 53.2$ | |
| $r_{17} = -161.703$ | | | |
| F | $D_1$ | $D_2$ | $D_3$ |
| 102.58 | 4.714 | 37.563 | 3.119 |
| 147.62 | 25.789 | 16.489 | 24.193 |
| 193 | 40.924 | 1.353 | 39.328 |
| $F_{II} = -0.714 F_W$ | | $F_{III} = 0.86 F_W$ | |
| $r_{I-1} = 1.026 F_W$ | | $|r_{II}| = 0.485 F_W$ | |
| $\Delta \overline{N}_{II} + \Delta \overline{N}_{III} = 0.28199$ | | $\Delta v_I = 21.1$ | |

| Embodiment 3 | | | |
|---|---|---|---|
| $r_1 = 83.719$ | | | |
| | $d_1 = 7.8$ | $n_1 = 1.60311$ | $\nu_1 = 60.7$ |
| $r_2 = -178.01$ | | | |
| | $d_2 = 2.49$ | $n_2 = 1.59551$ | $\nu_2 = 39.2$ |
| $r_3 = 213.01$ | | | |
| | $d_3 = D_1$ (variable) | | |
| $r_4 = 127.605$ | | | |
| | $d_4 = 1.58$ | $n_3 = 1.47069$ | $\nu_3 = 67.4$ |
| $r_5 = 50.027$ | | | |
| | $d_5 = 5.63$ | | |
| $r_6 = -52.717$ | | | |
| | $d_6 = 1.49$ | $n_4 = 1.56873$ | $\nu_4 = 63.2$ |
| $r_7 = 76.081$ | | | |
| | $d_7 = 6.3$ | $n_5 = 1.68893$ | $\nu_5 = 31.1$ |
| $r_8 = -516.424$ | | | |
| | $d_8 = D_2$ (variable) | | |
| $r_9 = 95.301$ | | | |
| | $d_9 = 1.51$ | $n_6 = 1.80518$ | $\nu_6 = 25.4$ |
| $r_{10} = 44.296$ | | | |
| | $d_{10} = 8.23$ | $n_7 = 1.62299$ | $\nu_7 = 58.1$ |
| $r_{11} = -86.766$ | | | |
| | $d_{11} = D_3$ (variable) | | |
| $r_{12} = 45.454$ | | | |
| | $d_{12} = 4.71$ | $n_8 = 1.72$ | $\nu_8 = 46$ |
| $r_{13} = 105.219$ | | | |
| | $d_{13} = 9.32$ | | |
| $r_{14} = -2263.939$ | | | |
| | $d_{14} = 3.22$ | $n_9 = 1.66755$ | $\nu_9 = 41.9$ |
| $r_{15} = 43.134$ | | | |
| | $d_{15} = 9.05$ | | |
| $r_{16} = 95.423$ | | | |
| | $d_{16} = 4.43$ | $n_{10} = 1.62012$ | $\nu_{10} = 49.7$ |
| $r_{17} = -2903.76$ | | | |
| F | $D_1$ | $D_2$ | $D_3$ |
| 102.71 | 1.879 | 39.428 | 13.804 |
| 147.8 | 22.954 | 18.354 | 34.878 |
| 193.23 | 38.089 | 3.218 | 50.013 |
| $F_{II} = -0.713F_W$ | | $F_{III} = 0.859F_W$ | |
| $r_{I-1} = 0.815F_W$ | | $|r_{II}| = 0.513F_W$ | |
| $\Delta\overline{N}_{II} + \Delta\overline{N}_{III} = 0.35141$ | | $\Delta\nu_I = 21.5$ | |

| Embodiment 4 | | | |
|---|---|---|---|
| $r_1 = 89.93$ | | | |
| | $d_1 = 2.49$ | $n_1 = 1.64769$ | $\nu_1 = 33.8$ |
| $r_2 = 47.682$ | | | |
| | $d_2 = 6.74$ | $n_2 = 1.6516$ | $\nu_2 = 58.7$ |
| $r_3 = 231.179$ | | | |
| | $d_3 = D_1$ (variable) | | |
| $r_4 = -266$ | | | |
| | $d_4 = 1.58$ | $n_3 = 1.51633$ | $\nu_3 = 64.2$ |
| $r_5 = 74.861$ | | | |
| | $d_5 = 5.23$ | | |
| $r_6 = -51.543$ | | | |
| | $d_6 = 1.58$ | $n_4 = 1.691$ | $\nu_4 = 54.8$ |
| $r_7 = 129.457$ | | | |
| | $d_7 = 4.88$ | $n_5 = 1.68893$ | $\nu_5 = 31.1$ |
| $r_8 = -84.447$ | | | |
| | $d_8 = D_2$ (variable) | | |
| $r_9 = 157.408$ | | | |
| | $d_9 = 1.51$ | $n_6 = 1.7847$ | $\nu_6 = 26.2$ |
| $r_{10} = 48.608$ | | | |
| | $d_{10} = 7.36$ | $n_7 = 1.72$ | $\nu_7 = 50.3$ |
| $r_{11} = -91.938$ | | | |
| | $d_{11} = D_3$ (variable) | | |
| $r_{12} = 57.692$ | | | |
| | $d_{12} = 5.19$ | $n_8 = 1.6968$ | $\nu_8 = 55.5$ |
| $r_{13} = 171.955$ | | | |
| | $d_{13} = 8.55$ | | |
| $r_{14} = -131.619$ | | | |
| | $d_{14} = 3.11$ | $n_9 = 1.57501$ | $\nu_9 = 41.5$ |
| $r_{15} = 68.064$ | | | |
| | $d_{15} = 8.8$ | | |
| $r_{16} = 1663.829$ | | | |
| | $d_{16} = 5.19$ | $n_{10} = 1.67$ | $\nu_{10} = 51.6$ |
| $r_{17} = -124.903$ | | | |
| F | $D_1$ | $D_2$ | $D_3$ |
| 102.58 | 6.698 | 36.823 | 14.306 |
| 147.62 | 27.773 | 15.749 | 35.38 |
| 193 | 42.908 | 0.613 | 50.515 |
| $F_{II} = -0.714F_W$ | | $F_{III} = 0.86F_W$ | |
| $r_{I-1} = 0.877F_W$ | | $|r_{II}| = 0.502F_W$ | |
| $\Delta\overline{N}_{II} + \Delta\overline{N}_{III} = 0.14997$ | | $\Delta\nu_I = 24.9$ | |

| Embodiment 5 | | | |
|---|---|---|---|
| $r_1 = 133.067$ | | | |
| | $d_1 = 3.00$ | $n_1 = 1.64769$ | $\nu_1 = 33.8$ |
| $r_2 = 65.29$ | | | |
| | $d_2 = 6.00$ | $n_2 = 1.6516$ | $\nu_2 = 58.7$ |
| $r_3 = 562.205$ | | | |
| | $d_3 = D_1$ (variable) | | |
| $r_4 = -217.465$ | | | |
| | $d_4 = 2.00$ | $n_3 = 1.51633$ | $\nu_3 = 64.2$ |
| $r_5 = 105.496$ | | | |
| | $d_5 = 4.00$ | | |
| $r_6 = -76.869$ | | | |
| | $d_6 = 2.00$ | $n_4 = 1.691$ | $\nu_4 = 54.8$ |
| $r_7 = 120.854$ | | | |
| | $d_7 = 4.81$ | $n_5 = 1.68893$ | $\nu_5 = 31.1$ |
| $r_8 = -130.195$ | | | |
| | $d_8 = D_2$ (variable) | | |
| $r_9 = 174.709$ | | | |
| | $d_9 = 1.92$ | $n_6 = 1.78472$ | $\nu_6 = 25.7$ |
| $r_{10} = 66.198$ | | | |
| | $d_{10} = 8.00$ | $n_7 = 1.691$ | $\nu_7 = 54.8$ |
| $r_{11} = -115.764$ | | | |
| | $d_{11} = D_3$ (variable) | | |
| $r_{12} = 34.949$ | | | |
| | $d_{12} = 5.05$ | $n_8 = 1.63854$ | $\nu_8 = 55.4$ |
| $r_{13} = 88.396$ | | | |
| | $d_{13} = 5.72$ | | |
| $r_{14} = -336.049$ | | | |
| | $d_{14} = 3.4$ | $n_9 = 1.56732$ | $\nu_9 = 42.8$ |
| $r_{15} = 35.326$ | | | |
| | $d_{15} = 5.89$ | | |
| $r_{16} = 267.612$ | | | |
| | $d_{16} = 5.45$ | $n_{10} = 1.62299$ | $\nu_{10} = 58.1$ |
| $r_{17} = -112.548$ | | | |
| F | $D_1$ | $D_2$ | $D_3$ |
| 102.69 | 2.6 | 48.162 | 24.166 |
| 144.97 | 27.831 | 22.931 | 49.397 |
| 193.4 | 48.533 | 2.229 | 70.099 |
| $F_{II} = -0.905F_W$ | | $F_{III} = 1.09F_W$ | |
| $r_{I-1} = 1.296F_W$ | | $|r_{II}| = 0.749F_W$ | |
| $\Delta\overline{N}_{II} + \Delta\overline{N}_{III} = 0.17899$ | | $\Delta\nu_I = 24.9$ | |

| Embodiment 6 | | | |
|---|---|---|---|
| $r_1 = 112.279$ | | | |
| | $d_1 = 3.00$ | $n_1 = 1.64769$ | $\nu_1 = 33.8$ |
| $r_2 = 65.37$ | | | |
| | $d_2 = 6.00$ | $n_2 = 1.6516$ | $\nu_2 = 58.7$ |
| $r_3 = 310.971$ | | | |
| | $d_3 = D_1$ (variable) | | |
| $r_4 = -303.957$ | | | |
| | $d_4 = 2.00$ | $n_3 = 1.51633$ | $\nu_3 = 64.2$ |
| $r_5 = 95.796$ | | | |
| | $d_5 = 4.00$ | | |
| $r_6 = -72.999$ | | | |
| | $d_6 = 2.00$ | $n_4 = 1.691$ | $\nu_4 = 54.8$ |
| $r_7 = 120.852$ | | | |
| | $d_7 = 4.81$ | $n_5 = 1.68893$ | $\nu_5 = 31.1$ |
| $r_8 = -123.895$ | | | |
| | $d_8 = D_2$ (variable) | | |
| $r_9 = 173.609$ | | | |
| | $d_9 = 1.92$ | $n_6 = 1.78472$ | $\nu_6 = 25.7$ |
| $r_{10} = 59.603$ | | | |
| | $d_{10} = 8.00$ | $n_7 = 1.691$ | $\nu_7 = 54.8$ |
| $r_{11} = -113.364$ | | | |
| | $d_{11} = D_3$ (variable) | | |
| $r_{12} = 32.184$ | | | |
| | $d_{12} = 5.05$ | $n_8 = 1.63854$ | $\nu_8 = 55.4$ |
| $r_{13} = 62.499$ | | | |

4,377,325

-continued

Embodiment 6

| | | | |
|---|---|---|---|
| $d_{13} = 5.72$ | | | |
| $r_{14} = -2741.179$ | | | |
| $d_{14} = 3.4$ | | $n_9 = 1.56732$ | $\nu_9 = 42.8$ |
| $r_{15} = 32.061$ | | | |
| $d_{15} = 5.89$ | | | |
| $r_{16} = 87.089$ | | | |
| $d_{16} = 5.45$ | | $n_{10} = 1.61484$ | $\nu_{10} = 51.2$ |
| $r_{17} = -270.876$ | | | |

| F | $D_1$ | $D_2$ | $D_3$ |
|---|---|---|---|
| 102.69 | 1.255 | 48.139 | 24.332 |
| 144.97 | 26.486 | 22.908 | 49.563 |
| 193.4 | 47.188 | 2.206 | 70.265 |

$F_{II} = -0.905F_W$  $F_{III} = 1.09F_W$
$r_{I-1} = 1.093F_W$  $|r_{II}| = 0.711F_W$
$\Delta \bar{N}_{II} + \Delta \bar{N}_{III} = 0.17899$  $\Delta \nu_I = 24.9$

Embodiment 7

| | | | |
|---|---|---|---|
| $r_1 = 132.817$ | | | |
| $d_1 = 3.00$ | | $n_1 = 1.64769$ | $\nu_1 = 33.8$ |
| $r_2 = 65.29$ | | | |
| $d_2 = 6.00$ | | $n_2 = 1.6516$ | $\nu_2 = 58.7$ |
| $r_3 = 557.645$ | | | |
| $d_3 = D_1$ (variable) | | | |
| $r_4 = -229.584$ | | | |
| $d_4 = 2.00$ | | $n_3 = 1.56873$ | $\nu_3 = 63.2$ |
| $r_5 = 110.963$ | | | |
| $d_5 = 4.00$ | | | |
| $r_6 = -73.683$ | | | |
| $d_6 = 2.00$ | | $n_4 = 1.755$ | $\nu_4 = 52.3$ |
| $r_7 = 434.45$ | | | |
| $d_7 = 5.00$ | | $n_5 = 1.7552$ | $\nu_5 = 27.5$ |
| $r_8 = -112.23$ | | | |
| $d_8 = D_2$ (variable) | | | |
| $r_9 = 176.246$ | | | |
| $d_9 = 1.92$ | | $n_6 = 1.78472$ | $\nu_6 = 25.7$ |
| $r_{10} = 65.907$ | | | |
| $d_{10} = 8.00$ | | $n_7 = 1.6935$ | $\nu_7 = 53.2$ |
| $r_{11} = -116.042$ | | | |
| $d_{11} = D_3$ (variable) | | | |
| $r_{12} = 36.32$ | | | |
| $d_{12} = 5.05$ | | $n_8 = 1.63854$ | $\nu_8 = 55.4$ |
| $r_{13} = 108.169$ | | | |
| $d_{13} = 5.72$ | | | |
| $r_{14} = -243.74$ | | | |
| $d_{14} = 3.4$ | | $n_9 = 1.56732$ | $\nu_9 = 42.8$ |
| $r_{15} = 36.744$ | | | |
| $d_{15} = 5.89$ | | | |
| $r_{16} = 1812.39$ | | | |
| $d_{16} = 5.45$ | | $n_{10} = 1.62299$ | $\nu_{10} = 58.1$ |
| $r_{17} = -90.179$ | | | |

| F | $D_1$ | $D_2$ | $D_3$ |
|---|---|---|---|
| 102.69 | 3.249 | 47.493 | 24.121 |
| 144.97 | 28.48 | 22.262 | 49.352 |
| 193.4 | 49.182 | 1.56 | 70.054 |

$F_{II} = -0.905F_W$  $F_{III} = 1.09F_W$
$r_{I-1} = 1.293F_W$  $|r_{II}| = 0.718F_W$
$\Delta \bar{N}_{II} + \Delta \bar{N}_{III} = 0.17899$  $\Delta \nu_I = 24.9$

Embodiment 8

| | | | |
|---|---|---|---|
| $r_1 = 83.643$ | | | |
| $d_1 = 6.74$ | | $n_1 = 1.6516$ | $\nu_1 = 58.7$ |
| $r_2 = -212.523$ | | | |
| $d_2 = 2.49$ | | $n_2 = 1.64769$ | $\nu_2 = 33.8$ |
| $r_3 = 191.847$ | | | |
| $d_3 = D_1$ (variable) | | | |
| $r_4 = -315.514$ | | | |
| $d_4 = 1.58$ | | $n_3 = 1.51633$ | $\nu_3 = 64.2$ |
| $r_5 = 73.972$ | | | |
| $d_5 = 5.23$ | | | |
| $r_6 = -50.788$ | | | |
| $d_6 = 1.58$ | | $n_4 = 1.691$ | $\nu_4 = 54.8$ |
| $r_7 = 129.457$ | | | |
| $d_7 = 4.88$ | | $n_5 = 1.68893$ | $\nu_5 = 31.1$ |
| $r_8 = -84.647$ | | | |

-continued

Embodiment 8

| | | | |
|---|---|---|---|
| $d_8 = D_2$ (variable) | | | |
| $r_9 = 154.659$ | | | |
| $d_9 = 1.51$ | | $n_6 = 1.78472$ | $\nu_6 = 25.7$ |
| $r_{10} = 45.712$ | | | |
| $d_{10} = 7.36$ | | $n_7 = 1.717$ | $\nu_7 = 47.9$ |
| $r_{11} = -90.848$ | | | |
| $d_{11} = D_3$ (variable) | | | |
| $r_{12} = 54.9$ | | | |
| $d_{12} = 5.19$ | | $n_8 = 1.6935$ | $\nu_8 = 53.2$ |
| $r_{13} = 136.19$ | | | |
| $d_{13} = 8.55$ | | | |
| $r_{14} = -180.558$ | | | |
| $d_{14} = 3.11$ | | $n_9 = 1.60717$ | $\nu_9 = 40.3$ |
| $r_{15} = 62.987$ | | | |
| $d_{15} = 8.8$ | | | |
| $r_{16} = 206.328$ | | | |
| $d_{16} = 5.15$ | | $n_{10} = 1.697$ | $\nu_{10} = 48.5$ |
| $r_{17} = -227.955$ | | | |

| F | $D_1$ | $D_2$ | $D_3$ |
|---|---|---|---|
| 102.58 | 5.936 | 36.92 | 14.577 |
| 147.62 | 27.011 | 15.846 | 35.651 |
| 193 | 42.146 | 0.71 | 50.786 |

$F_{II} = -0.714F_W$  $F_{III} = 0.86F_W$
$r_{I-1} = 0.815F_W$  $|r_{II}| = 0.495F_W$
$\Delta \bar{N}_{II} + \Delta \bar{N}_{III} = 1.5299$  $\Delta \nu_I = 24.9$

Embodiment 9

| | | | |
|---|---|---|---|
| $r_1 = 110.546$ | | | |
| $d_1 = 8.00$ | | $n_1 = 1.60311$ | $\nu_1 = 60.7$ |
| $r_2 = -109.204$ | | | |
| $d_2 = 2.49$ | | $n_2 = 1.5927$ | $\nu_2 = 35.3$ |
| $r_3 = 589.506$ | | | |
| $d_3 = D_1$ (variable) | | | |
| $r_4 = 531.834$ | | | |
| $d_4 = 1.58$ | | $n_3 = 1.47069$ | $\nu_3 = 67.4$ |
| $r_5 = 55.243$ | | | |
| $d_5 = 5.23$ | | | |
| $r_6 = -50.403$ | | | |
| $d_6 = 1.49$ | | $n_4 = 1.56873$ | $\nu_4 = 63.2$ |
| $r_7 = 48.592$ | | | |
| $d_7 = 6.3$ | | $n_5 = 1.61293$ | $\nu_5 = 37$ |
| $r_8 = -146.241$ | | | |
| $d_8 = D_2$ (variable) | | | |
| $r_9 = 95.275$ | | | |
| $d_9 = 1.51$ | | $n_6 = 1.80518$ | $\nu_6 = 25.4$ |
| $r_{10} = 42.377$ | | | |
| $d_{10} = 8.00$ | | $n_7 = 1.64328$ | $\nu_7 = 47.9$ |
| $r_{11} = -93.466$ | | | |
| $d_{11} = D_3$ (variable) | | | |
| $r_{12} = 57.906$ | | | |
| $d_{12} = 3.53$ | | $n_8 = 1.72916$ | $\nu_8 = 54.7$ |
| $r_{13} = 81.621$ | | | |
| $d_{13} = 5.73$ | | | |
| $r_{14} = -46.913$ | | | |
| $d_{14} = 2.04$ | | $n_9 = 1.59551$ | $\nu_9 = 39.2$ |
| $r_{15} = 110.375$ | | | |
| $d_{15} = 5.9$ | | | |
| $r_{16} = 1179.425$ | | | |
| $d_{16} = 4.5$ | | $n_{10} = 1.72916$ | $\nu_{10} = 54.7$ |
| $r_{17} = -49.279$ | | | |

| F | $D_1$ | $D_2$ | $D_3$ |
|---|---|---|---|
| 102.55 | 6.315 | 37.574 | 24.17 |
| 147.63 | 27.39 | 16.5 | 45.426 |
| 193 | 42.525 | 1.364 | 60.381 |

$F_{II} = -0.714F_W$  $F_{III} = 0.825F_W$
$r_{I-1} = 1.078F_W$  $|r_{II}| = 0.491F_W$
$\Delta \bar{N}_{II} + \Delta \bar{N}_{III} = 0.25512$  $\Delta \nu_I = 25.4$

Embodiment 10

| | | | |
|---|---|---|---|
| $r_1 = 105.943$ | | | |
| $d_1 = 8.16$ | | $n_1 = 1.641$ | $\nu_1 = 56.9$ |
| $r_2 = -88.174$ | | | |
| $d_2 = 2.56$ | | $n_2 = 1.6398$ | $\nu_2 = 34.5$ |
| $r_3 = 413.942$ | | | |

-continued

Embodiment 10

| | | |
|---|---|---|
| $d_3 = D_1$ (variable) | | |
| $r_4 = 592.383$ | | |
| $d_4 = 1.58$ | $n_3 = 1.47069$ | $\nu_3 = 67.4$ |
| $r_5 = 52.878$ | | |
| $d_5 = 5.28$ | | |
| $r_6 = -50.695$ | | |
| $d_6 = 1.49$ | $n_4 = 1.56384$ | $\nu_4 = 60.7$ |
| $r_7 = 58.485$ | | |
| $d_7 = 6.39$ | $n_5 = 1.64769$ | $\nu_5 = 33.8$ |
| $r_8 = -162.423$ | | |
| $d_8 = D_2$ (variable) | | |
| $r_9 = 98.044$ | | |
| $d_9 = 1.51$ | $n_6 = 1.78472$ | $\nu_6 = 25.7$ |
| $r_{10} = 41.174$ | | |
| $d_{10} = 8.01$ | $n_7 = 1.6393$ | $\nu_7 = 44.9$ |
| $r_{11} = -90.784$ | | |
| $d_{11} = D_3$ (variable) | | |
| $r_{12} = 52.793$ | | |
| $d_{12} = 3.95$ | $n_8 = 1.617$ | $\nu_8 = 62.8$ |
| $r_{13} = 495.894$ | | |
| $d_{13} = 6.01$ | | |
| $r_{14} = -79.838$ | | |
| $d_{14} = 2.16$ | $n_9 = 1.5814$ | $\nu_9 = 40.8$ |
| $r_{15} = 61.776$ | | |
| $d_{15} = 7.38$ | | |
| $r_{16} = -93.198$ | | |
| $d_{16} = 5.59$ | $n_{10} = 1.6516$ | $\nu_{10} = 58.7$ |
| $r_{17} = -47.068$ | | |

| F | $D_1$ | $D_2$ | $D_3$ |
|---|---|---|---|
| 102.57 | 5.641 | 37.314 | 6.823 |
| 147.62 | 26.716 | 16.24 | 27.897 |
| 193 | 41.851 | 1.104 | 43.032 |

$F_{II} = -0.714 F_W$  
$F_{III} = 0.86 F_W$  
$r_{I-1} = 1.033 F_W$  
$|r_{II}| = 0.494 F_W$  
$\Delta \overline{N}_{II} + \Delta \overline{N}_{III} = 0.27585$  
$\Delta \nu_I = 22.4$

Embodiment 11

| | | |
|---|---|---|
| $r_1 = 96.385$ | | |
| $d_1 = 8.12$ | $n_1 = 1.6935$ | $\nu_1 = 53.2$ |
| $r_2 = -147.812$ | | |
| $d_2 = 2.54$ | $n_2 = 1.68893$ | $\nu_2 = 31.1$ |
| $r_3 = 265.59$ | | |
| $d_3 = D_1$ (variable) | | |
| $r_4 = -89.008$ | | |
| $d_4 = 2.01$ | $n_3 = 1.72$ | $\nu_3 = 46.0$ |
| $r_5 = 32.669$ | | |
| $d_5 = 5.13$ | $n_4 = 1.80518$ | $\nu_4 = 25.4$ |
| $r_6 = 94.807$ | | |
| $d_6 = D_2$ (variable) | | |
| $r_7 = 65.425$ | | |
| $d_7 = 1.46$ | $n_5 = 1.78472$ | $\nu_5 = 25.7$ |
| $r_8 = 37.457$ | | |
| $d_8 = 9.35$ | $n_6 = 1.51112$ | $\nu_6 = 60.5$ |
| $r_9 = -70.214$ | | |
| $d_9 = D_3$ (variable) | | |
| $r_{10} = 65.873$ | | |
| $d_{10} = 4.69$ | $n_7 = 1.6935$ | $\nu_7 = 53.2$ |
| $r_{11} = -155.394$ | | |
| $d_{11} = 6.72$ | | |
| $r_{12} = -43.123$ | | |
| $d_{12} = 1.57$ | $n_8 = 1.56444$ | $\nu_8 = 43.8$ |
| $r_{13} = 68.728$ | | |
| $d_{13} = 5.44$ | | |
| $r_{14} = -36.524$ | | |
| $d_{14} = 5.19$ | $n_9 = 1.72$ | $\nu_9 = 50.3$ |
| $r_{15} = -29.335$ | | |

| F | $D_1$ | $D_2$ | $D_3$ |
|---|---|---|---|
| 102.43 | 5.723 | 40.817 | 5.099 |
| 147.68 | 26.045 | 20.495 | 25.421 |
| 193 | 40.64 | 5.9 | 40.016 |

$F_{II} = -0.689 F_W$  
$F_{III} = 0.831 F_W$  
$r_{I-1} = 0.941 F_W$  
$|r_{II}| = 0.869 F_W$  
$\Delta \overline{N}_{II} + \Delta \overline{N}_{III} = 0.35878$  
$\Delta \nu_I = 22.1$

Embodiment 12

| | | |
|---|---|---|
| $r_1 = 90$ | | |
| $d_1 = 8.12$ | $n_1 = 1.72$ | $\nu_1 = 50.3$ |
| $r_2 = -188.77$ | | |
| $d_2 = 2.54$ | $n_2 = 1.72151$ | $\nu_2 = 29.2$ |
| $r_3 = 211.414$ | | |
| $d_3 = D_1$ (variable) | | |
| $r_4 = -88.728$ | | |
| $d_4 = 2.01$ | $n_3 = 1.72$ | $\nu_3 = 46.0$ |
| $r_5 = 32.722$ | | |
| $d_5 = 5.1$ | $n_4 = 1.80518$ | $\nu_4 = 25.4$ |
| $r_6 = 95.135$ | | |
| $d_6 = D_2$ (variable) | | |
| $r_7 = 66.387$ | | |
| $d_7 = 1.46$ | $n_5 = 1.7847$ | $\nu_5 = 26.2$ |
| $r_8 = 37.268$ | | |
| $d_8 = 12.28$ | $n_6 = 1.5112$ | $\nu_6 = 60.5$ |
| $r_9 = -67.633$ | | |
| $d_9 = D_3$ (variable) | | |
| $r_{10} = 87.09$ | | |
| $d_{10} = 6.66$ | $n_7 = 1.741$ | $\nu_7 = 52.7$ |
| $r_{11} = -126.453$ | | |
| $d_{11} = 6.36$ | | |
| $r_{12} = -40.681$ | | |
| $d_{12} = 2.58$ | $n_8 = 1.57501$ | $\nu_8 = 41.5$ |
| $r_{13} = 95.699$ | | |
| $d_{13} = 5.36$ | | |
| $r_{14} = -34.928$ | | |
| $d_{14} = 4.49$ | $n_9 = 1.757$ | $\nu_9 = 47.9$ |
| $r_{15} = -28.783$ | | |

| F | $D_1$ | $D_2$ | $D_3$ |
|---|---|---|---|
| 102.43 | 4.856 | 39.398 | 3.793 |
| 147.68 | 25.178 | 19.076 | 24.115 |
| 193 | 39.773 | 4.481 | 38.71 |

$F_{II} = -0.689 F_W$  
$F_{III} = 0.831 F_W$  
$r_{I-1} = 0.879 F_W$  
$|r_{II}| = 0.866 F_W$  
$\Delta \overline{N}_{II} + \Delta \overline{N}_{III} = 0.35878$  
$\Delta \nu_I = 21.1$

Embodiment 13

| | | |
|---|---|---|
| $r_1 = 113.804$ | | |
| $d_1 = 8.12$ | $n_1 = 1.6935$ | $\nu_1 = 53.2$ |
| $r_2 = -112.521$ | | |
| $d_2 = 2.54$ | $n_2 = 1.6727$ | $\nu_2 = 32.1$ |
| $r_3 = 424.128$ | | |
| $d_3 = D_1$ (variable) | | |
| $r_4 = -87.131$ | | |
| $d_4 = 2.01$ | $n_3 = 1.72$ | $\nu_3 = 43.7$ |
| $r_5 = 29.983$ | | |
| $d_5 = 5.73$ | $n_4 = 1.7847$ | $\nu_4 = 26.2$ |
| $r_6 = 99.986$ | | |
| $d_6 = D_2$ (variable) | | |
| $r_7 = 64.722$ | | |
| $d_7 = 1.46$ | $n_5 = 1.72151$ | $\nu_5 = 29.2$ |
| $r_8 = 34.909$ | | |
| $d_8 = 9$ | $n_6 = 1.51112$ | $\nu_6 = 60.5$ |
| $r_9 = -74.582$ | | |
| $d_9 = D_3$ (variable) | | |
| $r_{10} = 68.175$ | | |
| $d_{10} = 4.22$ | $n_7 = 1.72916$ | $\nu_7 = 54.7$ |
| $r_{11} = -179.302$ | | |
| $d_{11} = 7.03$ | | |
| $r_{12} = -44.073$ | | |
| $d_{12} = 1.74$ | $n_8 = 1.57309$ | $\nu_8 = 42.6$ |
| $r_{13} = 65.55$ | | |
| $d_{13} = 5.98$ | | |
| $r_{14} = -38.983$ | | |
| $d_{14} = 4.94$ | $n_9 = 1.6935$ | $\nu_9 = 53.2$ |
| $r_{15} = -29.562$ | | |

| F | $D_1$ | $D_2$ | $D_3$ |
|---|---|---|---|
| 102.43 | 7.055 | 40.819 | 4.362 |
| 147.68 | 27.377 | 20.497 | 24.684 |
| 193 | 41.972 | 5.902 | 39.279 |

$F_{II} = -0.689 F_W$  
$F_{III} = 0.831 F_W$  
$r_{I-1} = 1.111 F_W$  
$|r_{II}| = 0.851 F_W$  
$\Delta \overline{N}_{II} + \Delta \overline{N}_{III} = 0.27509$  
$\Delta \nu_I = 21.1$

Embodiment 14

$r_1 = 112.359$
$r_2 = -112$
$r_3 = 452.529$
$r_4 = -93.072$
$r_5 = 30.606$
$r_6 = 89.243$
$r_7 = 62.002$
$r_8 = 35.748$
$r_9 = -73.57$
$r_{10} = 58.62$
$r_{11} = -450.663$
$r_{12} = -52.901$
$r_{13} = 55.615$
$r_{14} = -41.768$
$r_{15} = -32.06$ $d_1 = 8.12$, $n_1 = 1.6935$, $\nu_1 = 53.2$
$d_2 = 2.54$, $n_2 = 1.68893$, $\nu_2 = 31.1$
$d_3 = D_1$ (variable)
$d_4 = 2.01$, $n_3 = 1.72$, $\nu_3 = 46$
$d_5 = 5.29$, $n_4 = 1.80518$, $\nu_4 = 25.4$
$d_6 = D_2$ (variable)
$d_7 = 1.46$, $n_5 = 1.7847$, $\nu_5\ 26.2$
$d_8 = 8.67$, $n_6 = 1.51112$, $\nu_6 = 60.5$
$d_9 = D_3$ (variable)
$d_{10} = 4.29$, $n_7 = 1.741$, $\nu_7 = 52.7$
$d_{11} = 6.98$
$d_{12} = 1.79$, $n_8 = 1.57501$, $\nu_8 = 41.5$
$d_{13} = 6.1$
$d_{14} = 5.36$, $n_9 = 1.757$, $\nu_9 = 47.9$

| F | $D_1$ | $D_2$ | $D_3$ |
|---|---|---|---|
| 102.43 | 6.883 | 41.409 | 3.978 |
| 147.68 | 27.205 | 21.087 | 24.3 |
| 193 | 41.8 | 6.492 | 38.895 |

$F_{II} = -0.689 F_W$, $F_{III} = 0.831 F_W$
$r_{I-1} = 1.097 F_W$, $|r_{III}| = 0.909 F_W$
$\Delta \bar{N}_{II} + \Delta \bar{N}_{III} = 0.35878$, $\Delta \nu_I = 21.1$

Embodiment 15

$r_1 = 102.732$
$r_2 = -162.479$
$r_3 = 361.524$
$r_4 = -83.421$
$r_5 = 32.836$
$r_6 = 71.388$
$r_7 = 121.646$
$r_8 = 33.117$
$r_9 = -88.167$
$r_{10} = 53.895$
$r_{11} = 365.658$
$r_{12} = -65.215$
$r_{13} = 71.468$
$r_{14} = -77.557$
$r_{15} = -41.329$ $d_1 = 5.8$, $n_1 = 1.641$, $\nu_1 = 56.9$
$d_2 = 2.3$, $n_2 = 1.61293$, $\nu_2 = 37$
$d_3 = D_1$ (variable)
$d_4 = 2.0$, $n_3 = 1.62012$, $\nu_3 = 49.7$
$d_5 = 4.0$, $n_4 = 1.76182$, $\nu_4 = 26.6$
$d_6 = D_2$ (variable)
$d_7 = 2.1$, $n_5 = 1.69895$, $\nu_5 = 30.1$
$d_8 = 7.3$, $n_6 = 1.6583$, $\nu_6 = 57.3$
$d_9 = D_3$ (variable)
$d_{10} = 4.4$, $n_7 = 1.6485$, $\nu_7 = 53$
$d_{11} = 6.5$
$d_{12} = 2.5$, $n_8 = 1.57957$, $\nu_8 = 53.8$
$d_{13} = 3.5$
$d_{14} = 3.5$, $n_9 = 1.6485$, $\nu_9 = 53$

| F | $D_1$ | $D_2$ | $D_3$ |
|---|---|---|---|
| 103.21 | 5.861 | 38.303 | 7.685 |
| 150.42 | 26.861 | 17.303 | 28.685 |
| 193.98 | 40.861 | 3.303 | 42.685 |

$F_{II} = -0.696 F_W$, $F_{III} = 0.822 F_W$
$r_{I-1} = 0.995 F_W$, $|r_{III}| = 0.808 F_W$
$\Delta \bar{N}_{II} + \Delta \bar{N}_{III} = 0.18235$, $\Delta \nu_I = 19.9$

Embodiment 16

$r_1 = 92.369$
$r_2 = -124.044$
$r_3 = 319.244$
$r_4 = -79.057$
$r_5 = 31.23$
$r_6 = 76.086$
$r_7 = 116.231$
$r_8 = 30.798$
$r_9 = -82.003$
$r_{10} = 65.384$
$r_{11} = 560.402$
$r_{12} = -58.027$
$r_{13} = 82.065$
$r_{14} = -76.837$
$r_{15} = -41.224$ $d_1 = 5.18$, $n_1 = 1.641$, $\nu_1 = 56.9$
$d_2 = 2.09$, $n_2 = 1.61293$, $\nu_2 = 37$
$d_3 = D_1$ (variable)
$d_4 = 1.8$, $n_3 = 1.6825$, $\nu_3 = 44.7$
$d_5 = 4$, $n_4 = 1.80518$, $\nu_4 = 25.4$
$d_6 = D_2$ (variable)
$d_7 = 1.89$, $n_5 = 1.74077$, $\nu_5 = 27.8$
$d_8 = 7.5$, $n_6 = 1.697$, $\nu_6 = 48.5$
$d_9 = D_3$ (variable)
$d_{10} = 6.4$, $n_7 = 1.6583$, $\nu_7 = 53.4$
$d_{11} = 9.47$
$d_{12} = 3.65$, $n_8 = 1.57135$, $\nu_8 = 52.9$
$d_{13} = 4.5$
$d_{14} = 4.5$, $n_9 = 1.6583$, $\nu_9 = 57.3$

| F | $D_1$ | $D_2$ | $D_3$ |
|---|---|---|---|
| 103.47 | 5.166 | 32.565 | 5.851 |
| 150.12 | 23.766 | 13.965 | 24.451 |
| 193 | 36.166 | 1.565 | 36.851 |

$F_{II} = -0.625 F_W$, $F_{III} = 0.731 F_W$
$r_{I-1} = 0.893 F_W$, $|r_{III}| = 0.764 F_W$
$\Delta \bar{N}_{II} + \Delta \bar{N}_{III} = 0.16645$, $\Delta \nu_I = 19.9$

Embodiment 17

$r_1 = 84.518$
$r_2 = 46$
$r_3 = 198.951$
$r_4 = -78.795$
$r_5 = 36.692$
$r_6 = 66.303$
$r_7 = 170.898$
$r_8 = 36.304$
$r_9 = -89.32$
$r_{10} = 96.33$
$r_{11} = 249.545$
$r_{12} = -135.661$
$r_{13} = -255.847$ $d_1 = 2.5$, $n_1 = 1.6398$, $\nu_1 = 34.5$
$d_2 = 5.74$, $n_2 = 1.641$, $\nu_2 = 56.9$
$d_3 = D_1$ (variable)
$d_4 = 2.13$, $n_3 = 1.56883$, $\nu_3 = 56.1$
$d_5 = 4.27$, $n_4 = 1.78472$, $\nu_4 = 25.7$
$d_6 = D_2$ (variable)
$d_7 = 2.67$, $n_5 = 1.72825$, $\nu_5 = 28.5$
$d_8 = 7.48$, $n_6 = 1.697$, $\nu_6 = 48.5$
$d_9 = D_3$ (variable)
$d_{10} = 4$, $n_7 = 1.6516$, $\nu_7 = 58.7$
$d_{11} = 2.43$
$d_{12} = 4$, $n_8 = 1.53256$, $\nu_8 = 45.9$

| F | $D_1$ | $D_2$ | $D_3$ |
|---|---|---|---|
| 103.28 | 4.908 | 43.74 | 8.179 |
| 150 | 26.961 | 21.687 | 30.232 |
| 193.59 | 41.761 | 6.887 | 45.032 |

$F_{II} = -0.73 F_W$, $F_{III} = 0.877 F_W$
$r_{I-1} = 0.818 F_W$, $|r_{III}| = 0.763 F_W$
$\Delta \bar{N}_{II} + \Delta \bar{N}_{III} = 0.24714$, $\Delta \nu_I = 22.4$

Embodiment 18

| | | | |
|---|---|---|---|
| $r_1 = 84.075$ | | | |
| | $d_1 = 6.2$ | $n_1 = 1.641$ | $v_1 = 56.9$ |
| $r_2 = -170.085$ | | | |
| | $d_2 = 2.3$ | $n_2 = 1.61293$ | $v_2 = 37$ |
| $r_3 = 190.102$ | | | |
| | $d_3 = D_1$ (variable) | | |
| $r_4 = -75.21$ | | | |
| | $d_4 = 2$ | $n_3 = 1.57135$ | $v_3 = 52.9$ |
| $r_5 = 35.178$ | | | |
| | $d_5 = 4$ | $n_4 = 1.78472$ | $v_4 = 25.7$ |
| $r_6 = 64.055$ | | | |
| | $d_6 = D_2$ (variable) | | |
| $r_7 = 148.889$ | | | |
| | $d_7 = 2.2$ | $n_5 = 1.7285$ | $v_5 = 28.5$ |
| $r_8 = 34.759$ | | | |
| | $d_8 = 7.5$ | $n_6 = 1.697$ | $v_6 = 48.5$ |
| $r_9 = -90.578$ | | | |
| | $d_9 = D_3$ (variable) | | |
| $r_{10} = 108.982$ | | | |
| | $d_{10} = 3$ | $n_7 = 1.691$ | $v_7 = 54.8$ |
| $r_{11} = 417.251$ | | | |
| | $d_{11} = 1.97$ | | |
| $r_{12} = -135.649$ | | | |
| | $d_{12} = 4.2$ | $n_8 = 1.53172$ | $v_8 = 48.9$ |
| $r_{13} = -368.112$ | | | |

| F | $D_1$ | $D_2$ | $D_3$ |
|---|---|---|---|
| 103.45 | 5.595 | 42.225 | 12.463 |
| 149.94 | 26.582 | 21.238 | 33.45 |
| 193 | 40.615 | 7.205 | 47.483 |
| $F_{II} = -0.696F_W$ | | $F_{III} = 0.84F_W$ | |
| $r_{I\text{-}1} = 0.813F_W$ | | $|r_{II}| = 0.727F_W$ | |
| $\Delta \overline{N}_{II} + \Delta \overline{N}_{III} = 0.24462$ | | $\Delta v_I = 19.9$ | |

In the above embodiments, reference symbols $r_1$, $r_2$, ... respectively represent radii of curvature of respective lens surfaces, reference symbols $d_1$, $d_2$, ... respectively represent thicknesses of respective lenses and airspaces between respective lenses, reference symbols $n_1$, $n_2$, ... respectively represent refractive indices of respective lenses, reference symbols $v_1$, $v_2$, ... respectively represent Abbe's numbers of respective lenses, and reference symbol F represents the focal length of the lens system as a whole.

Figure 3:
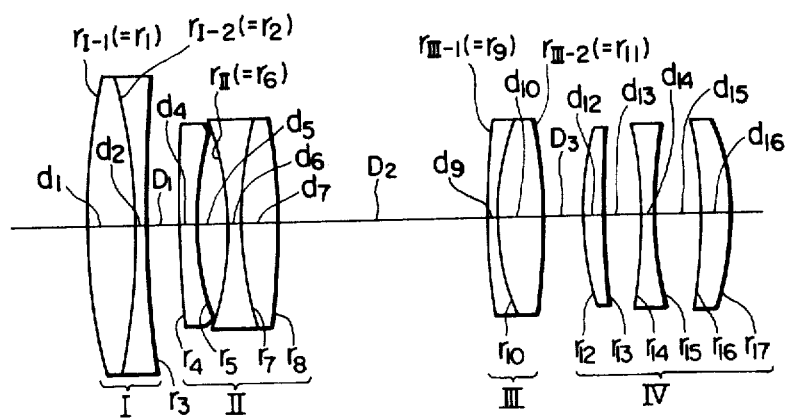
FIG. 3 shows a sectional view of Embodiments 1 through 10 of the zoom lens system according to the present invention.
Figure 4:
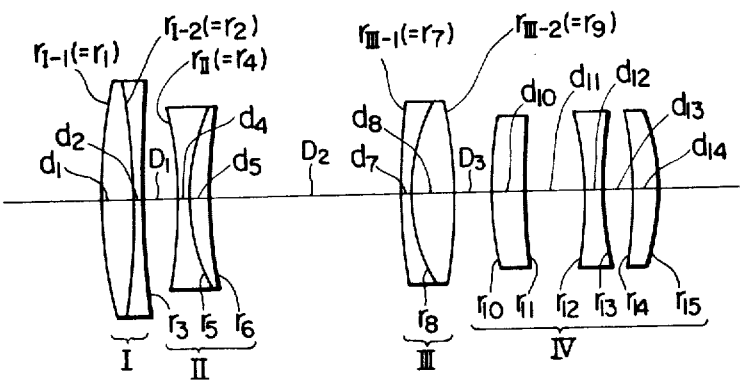
FIG. 4 shows a sectional view of Embodiments 11 through 16 of the zoom lens system according to the present invention.
Figure 5:
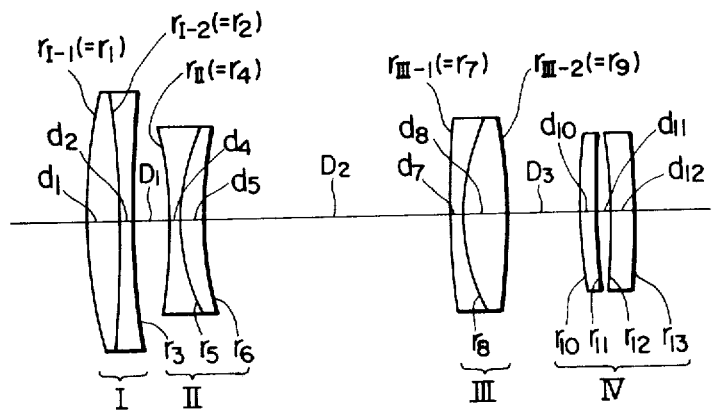
FIG. 5 shows a sectional view of Embodiments 17 and 18 of the zoom lens system according to the present invention.
Figure 6:
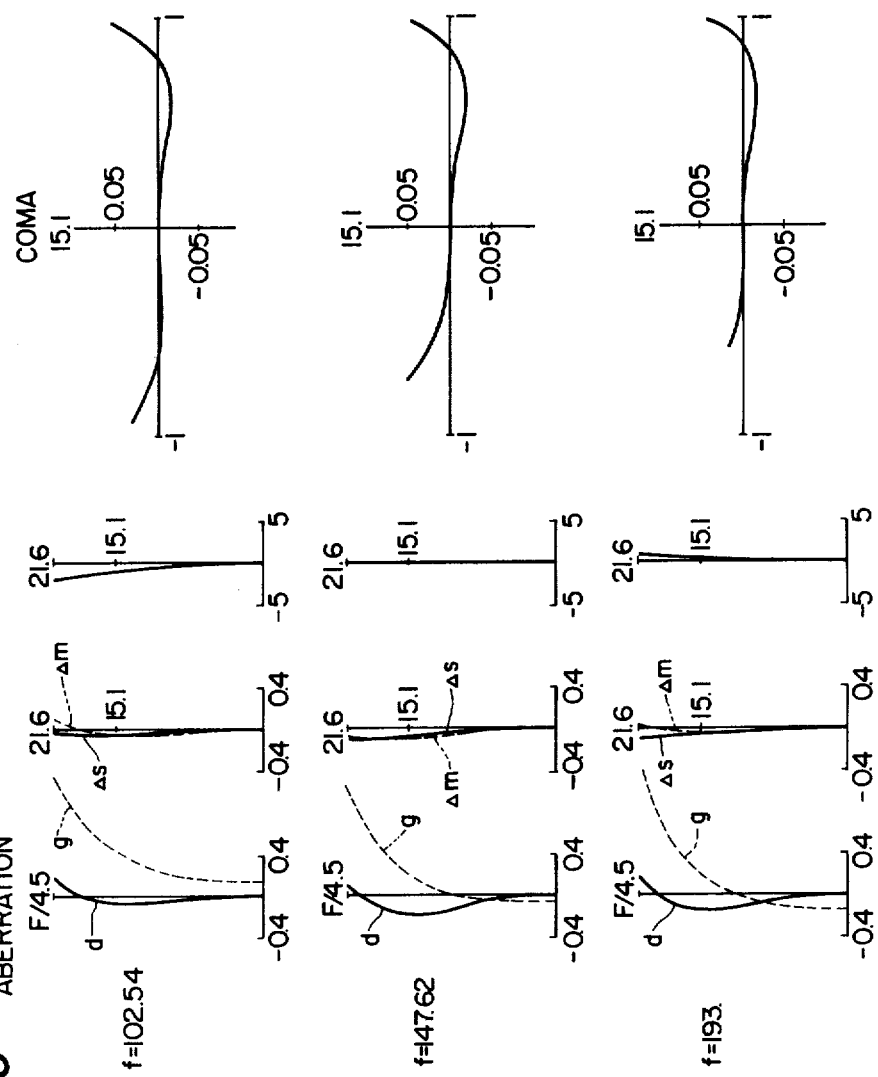
FIGS. 6 through 23 respectively show graphs illustrating aberration curves of Embodiments 1 through 18 of the zoom lens system according to the present invention.
Figure 7:
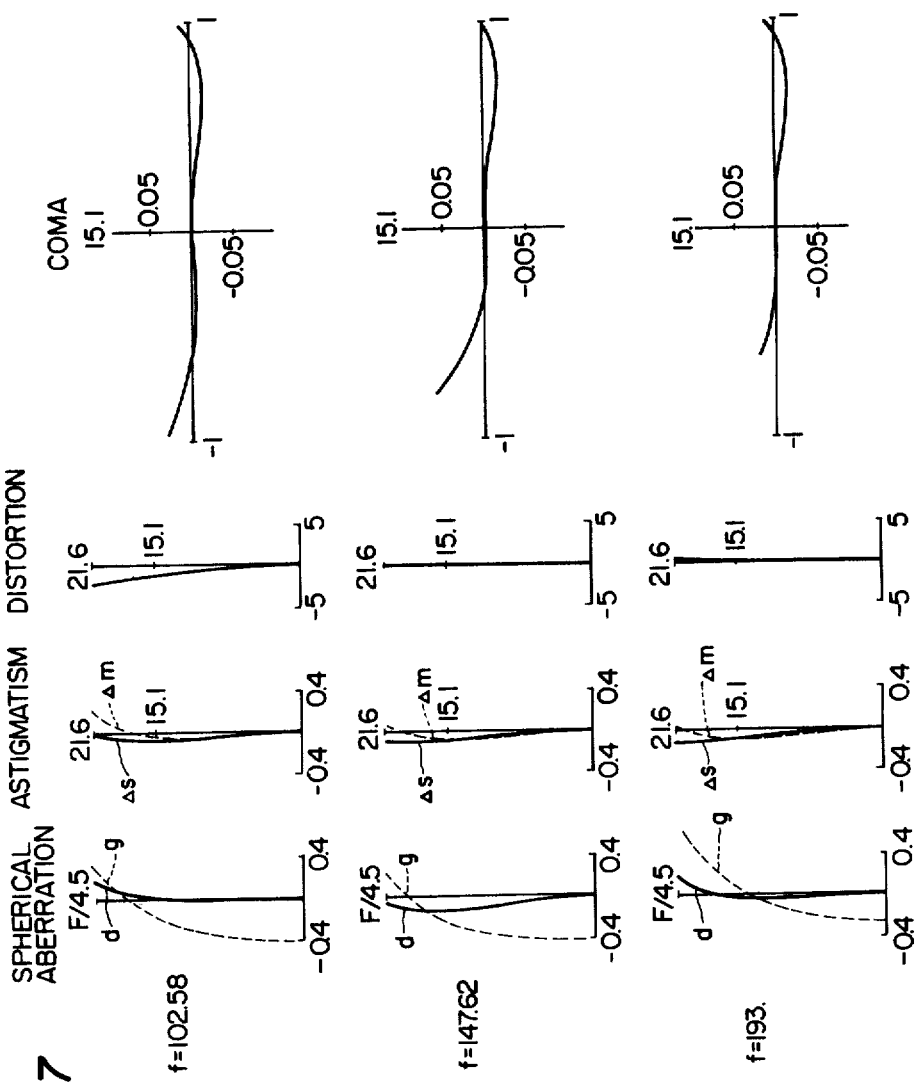
Figure 8:
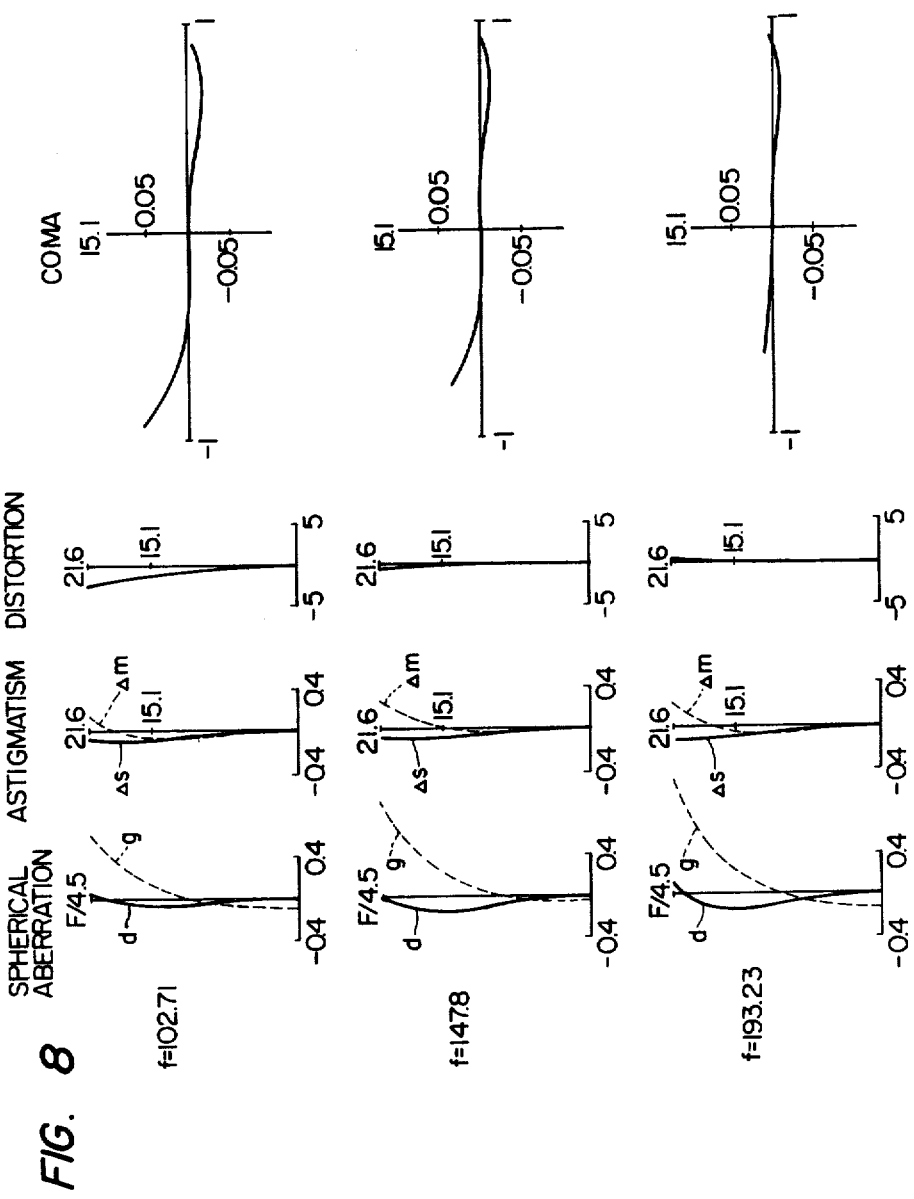
Figure 9:
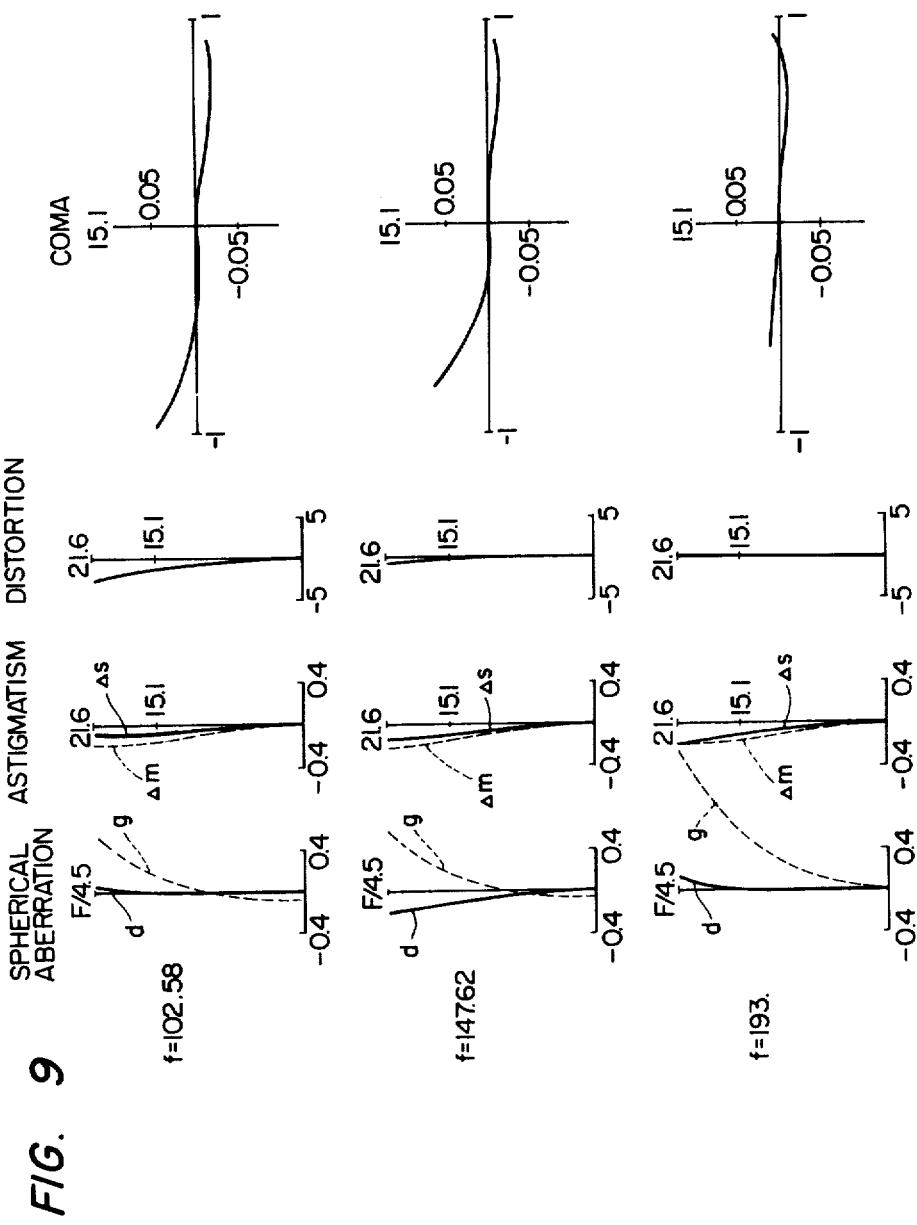
Figure 10:
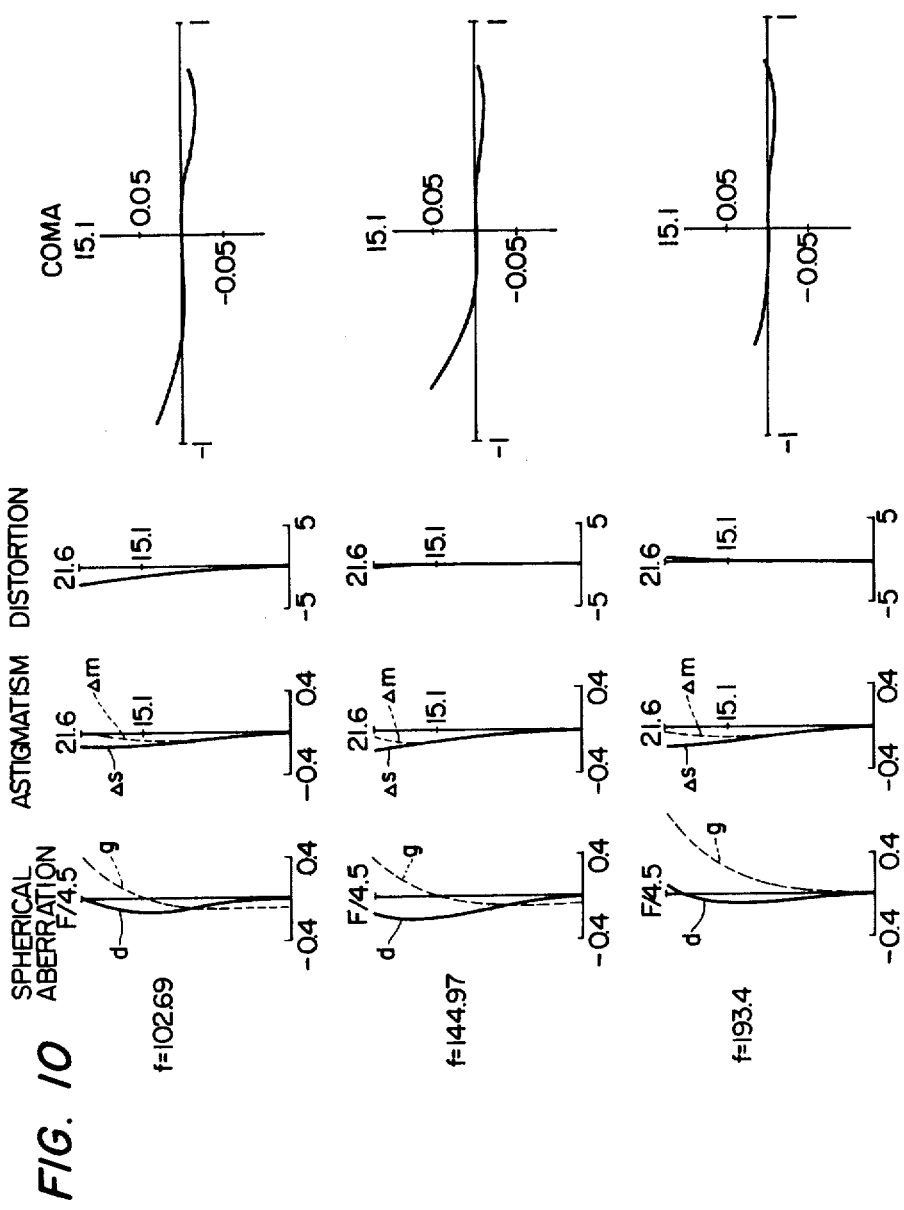
Figure 11:
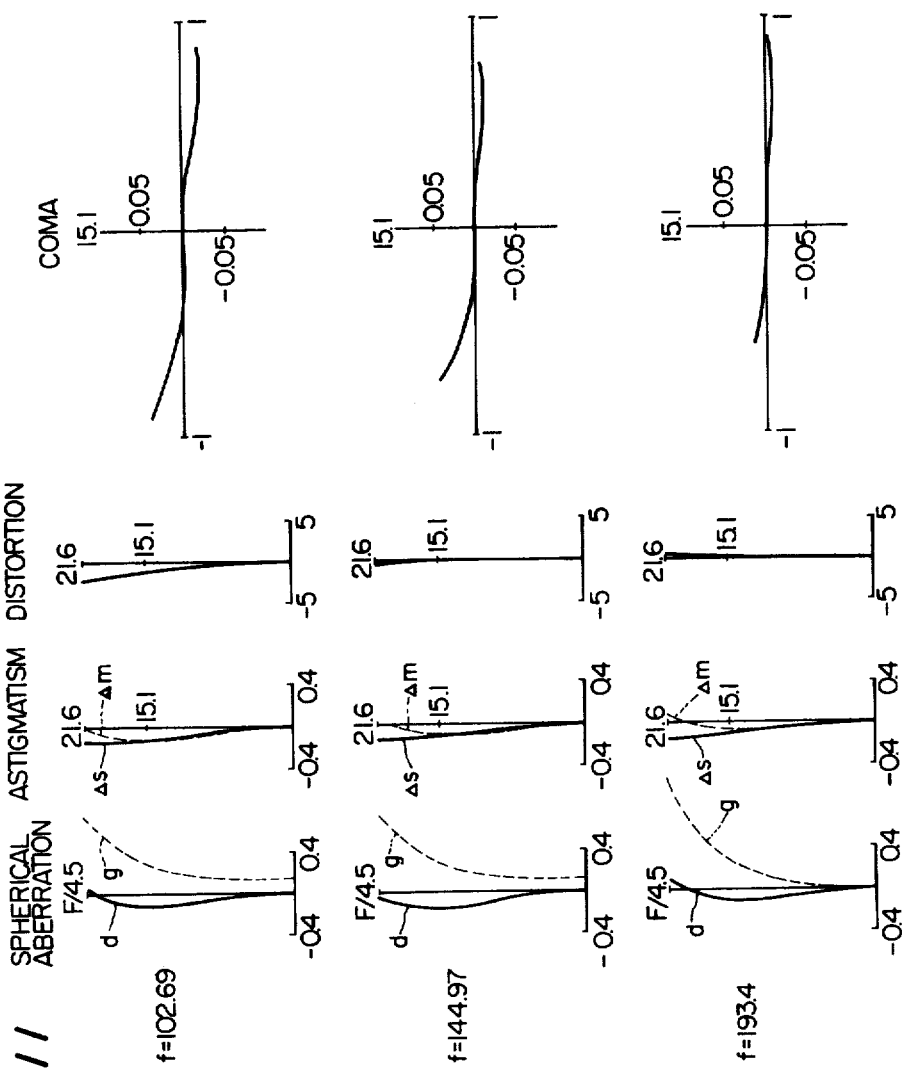
Figure 12:
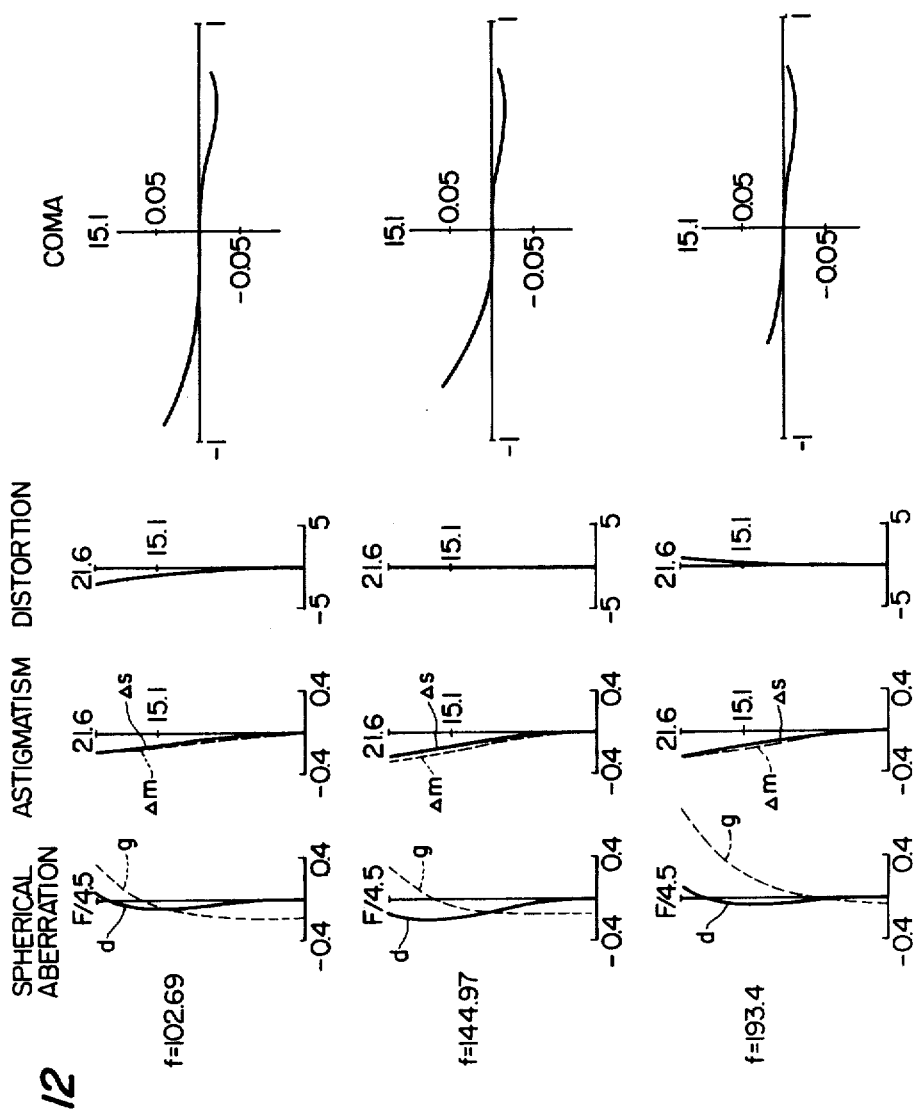
Figure 13:
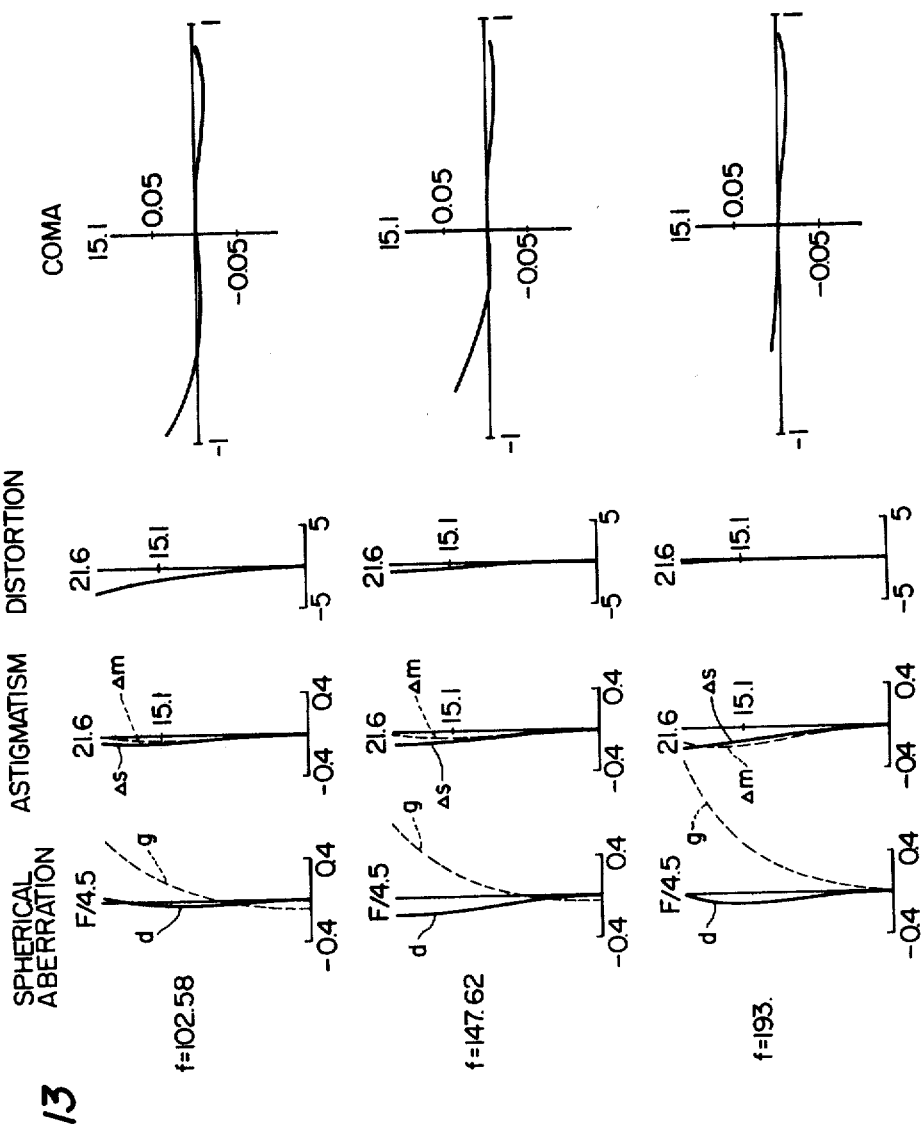
Figure 14:
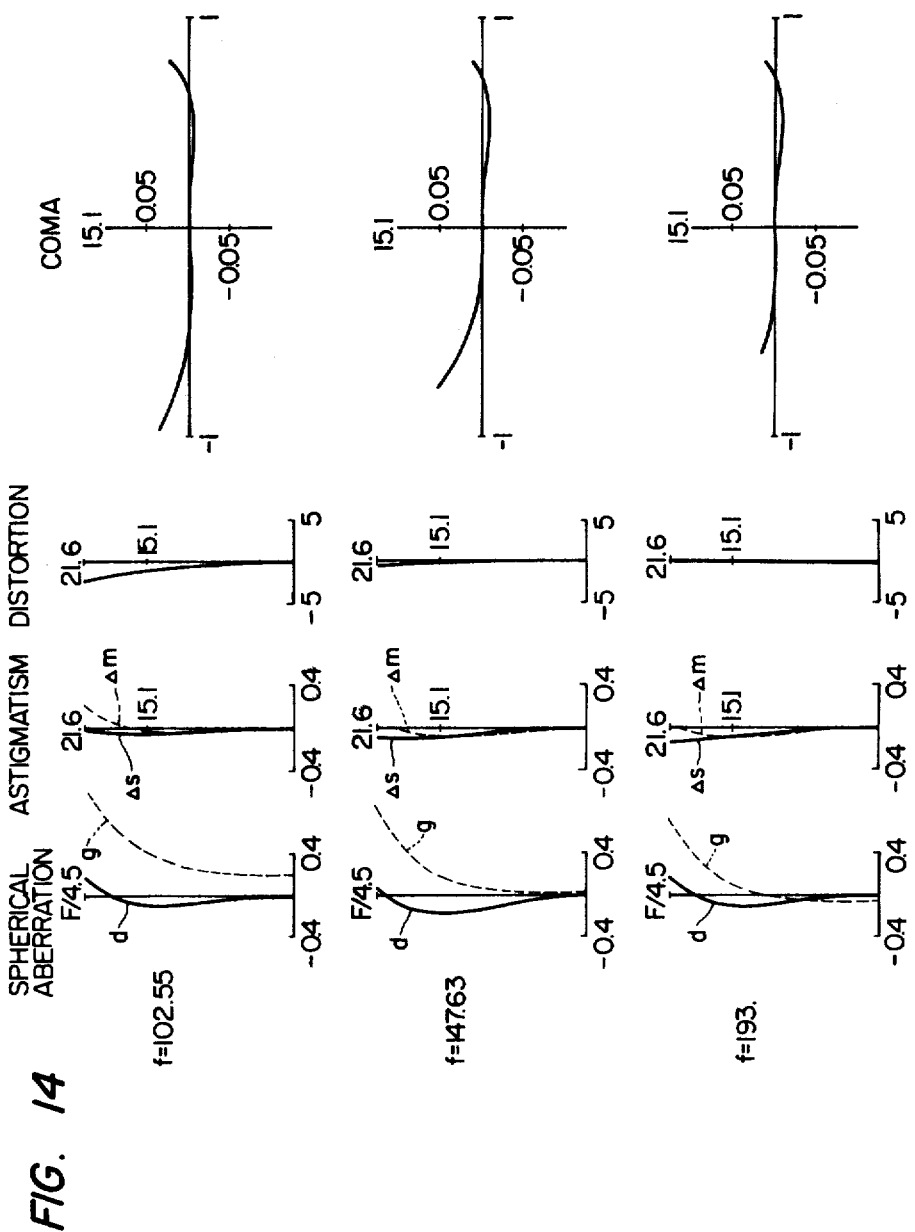
Figure 15:
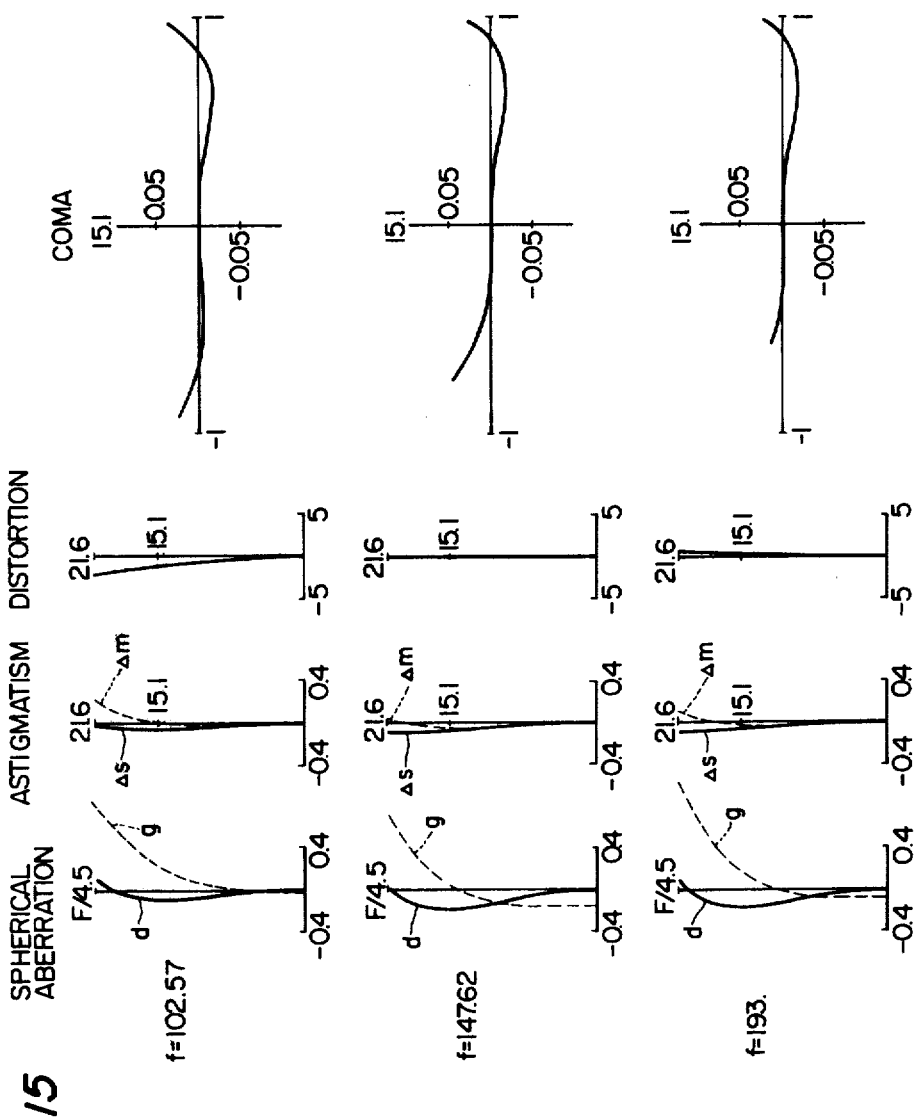
Figure 16:
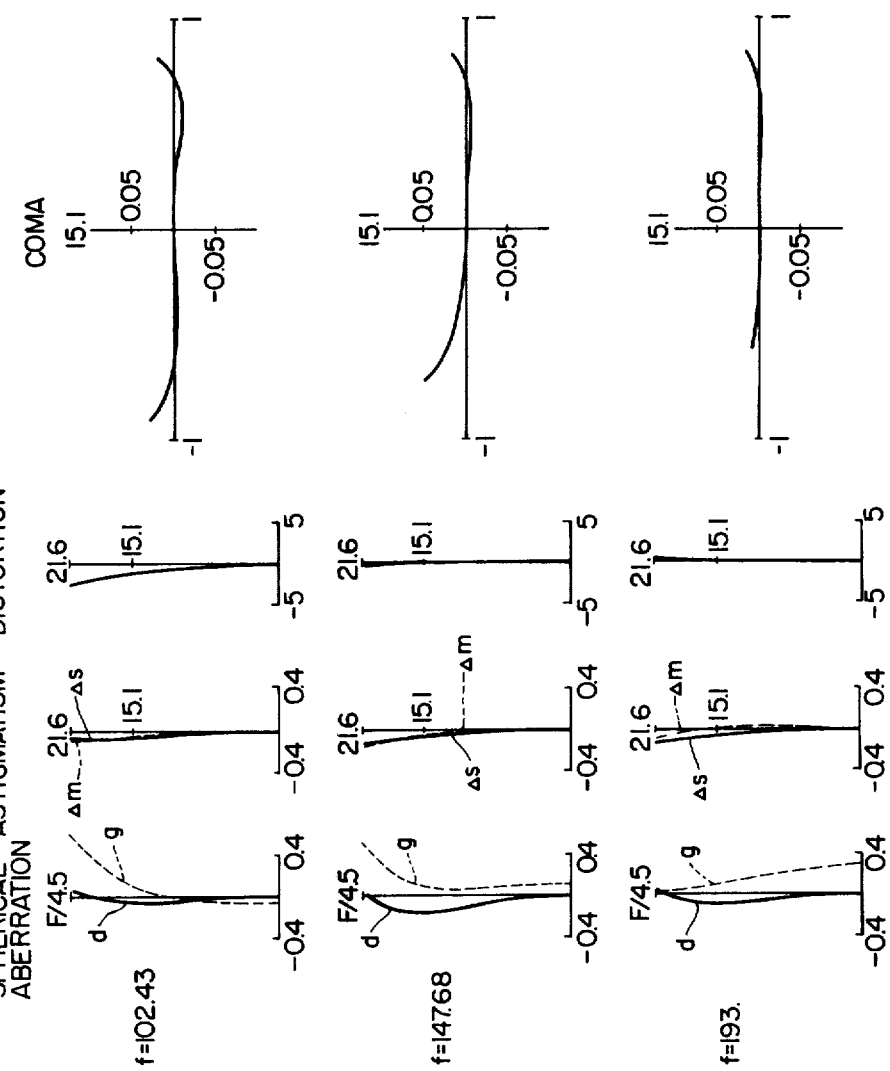
Figure 17:
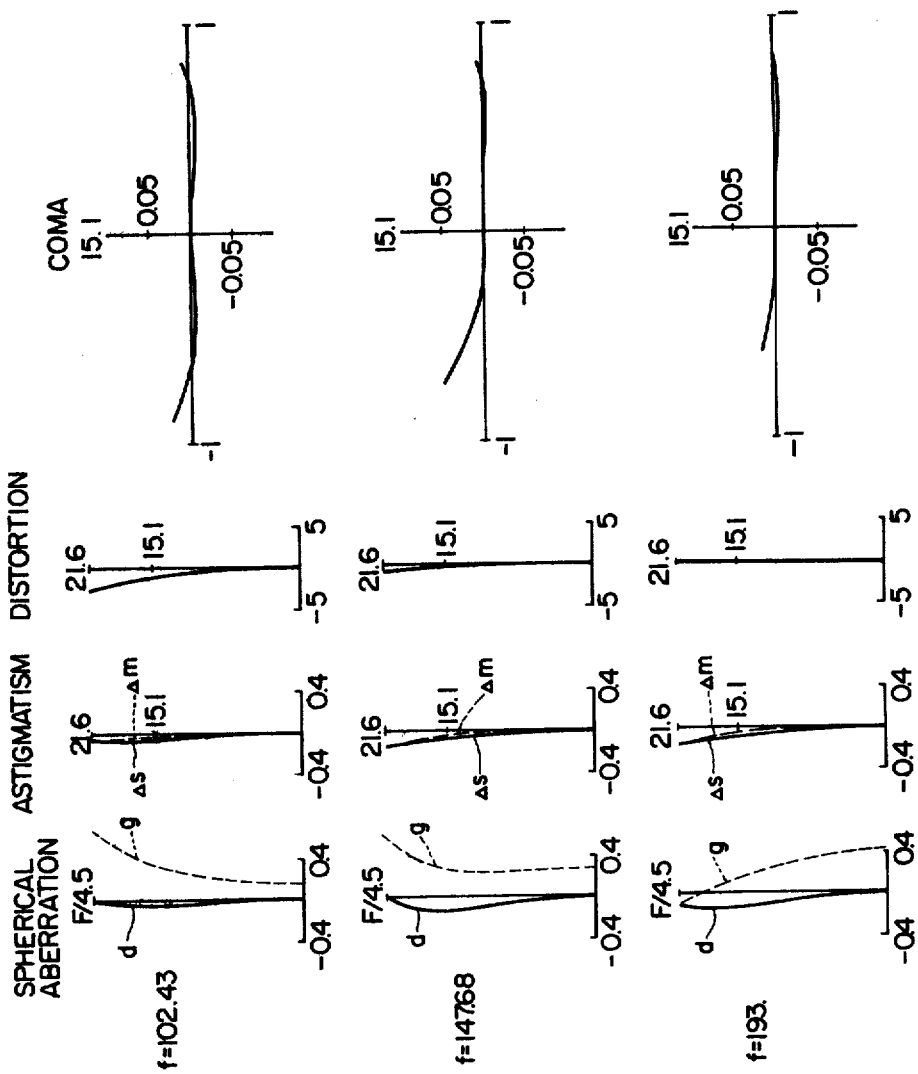
Figure 18:
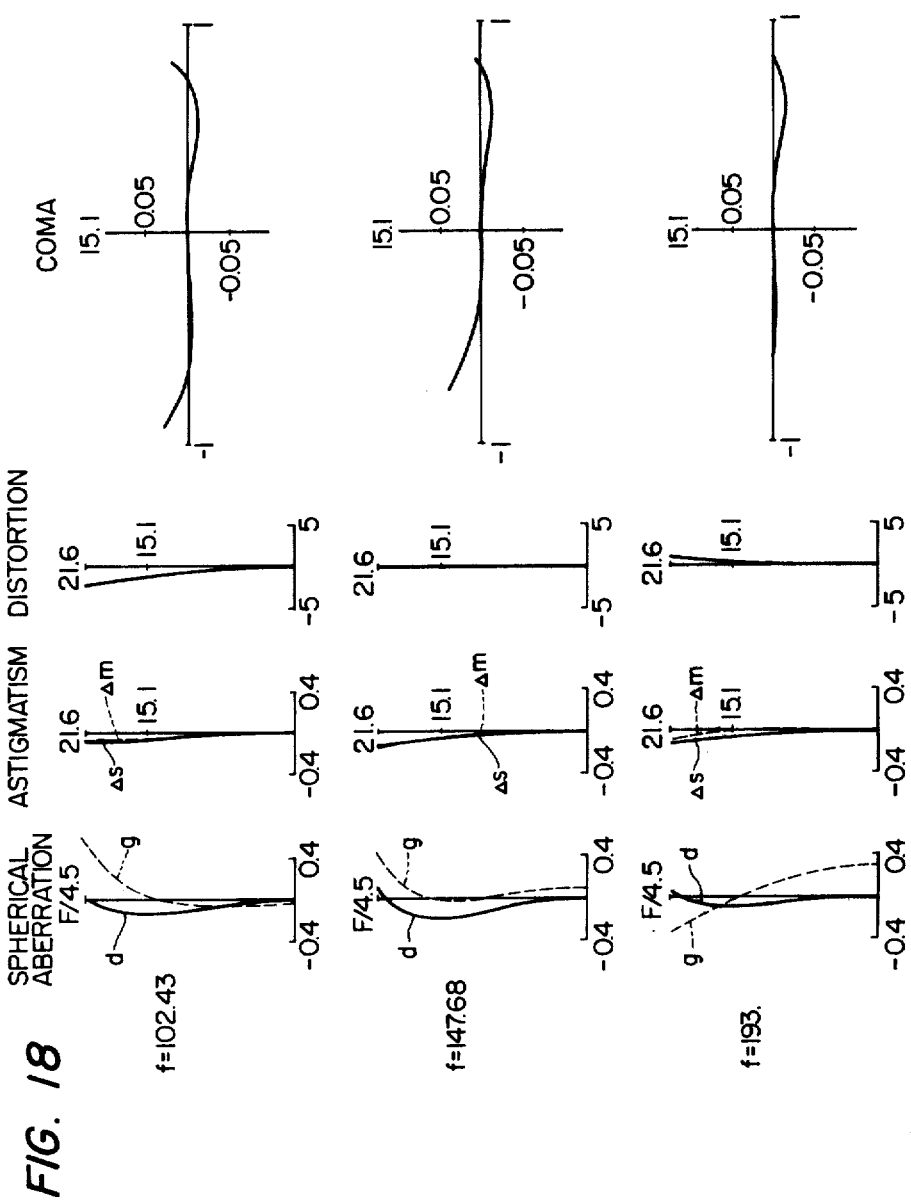
Figure 19:
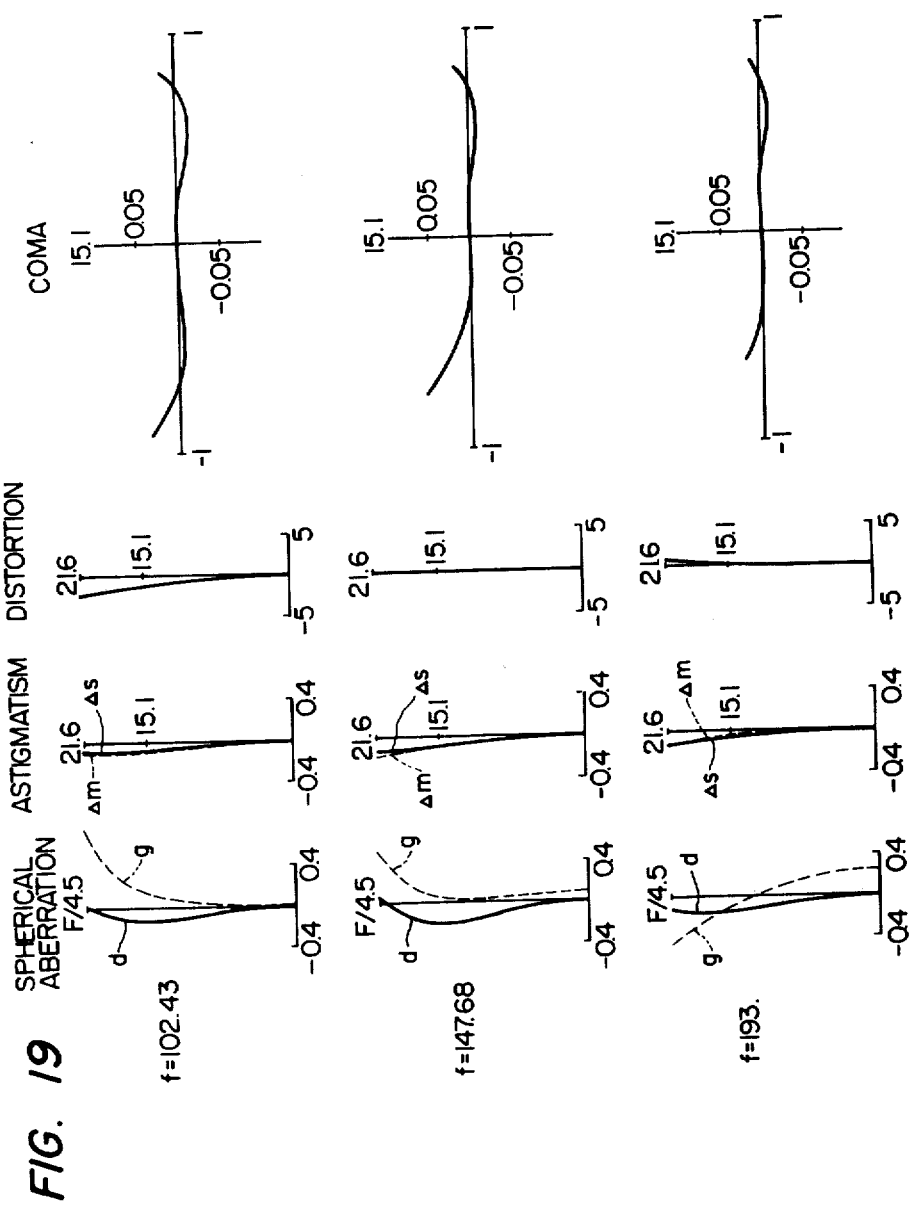
Figure 20:
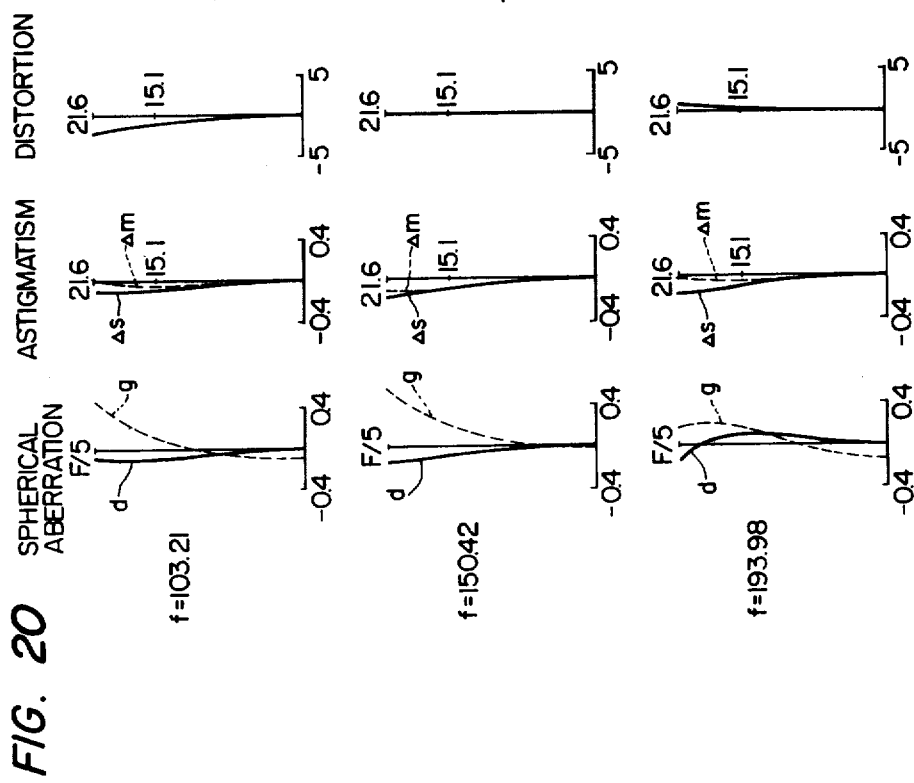
Figure 21:
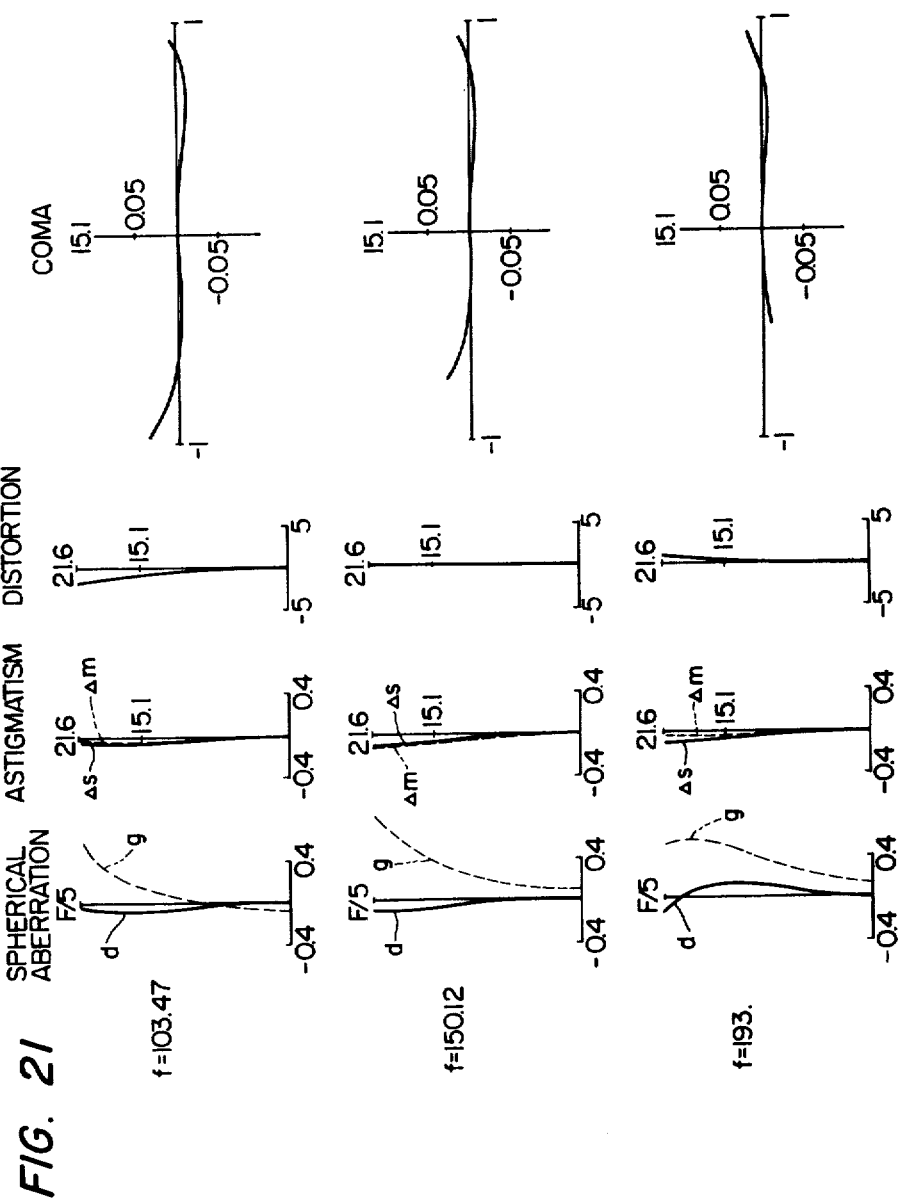
Figure 22:
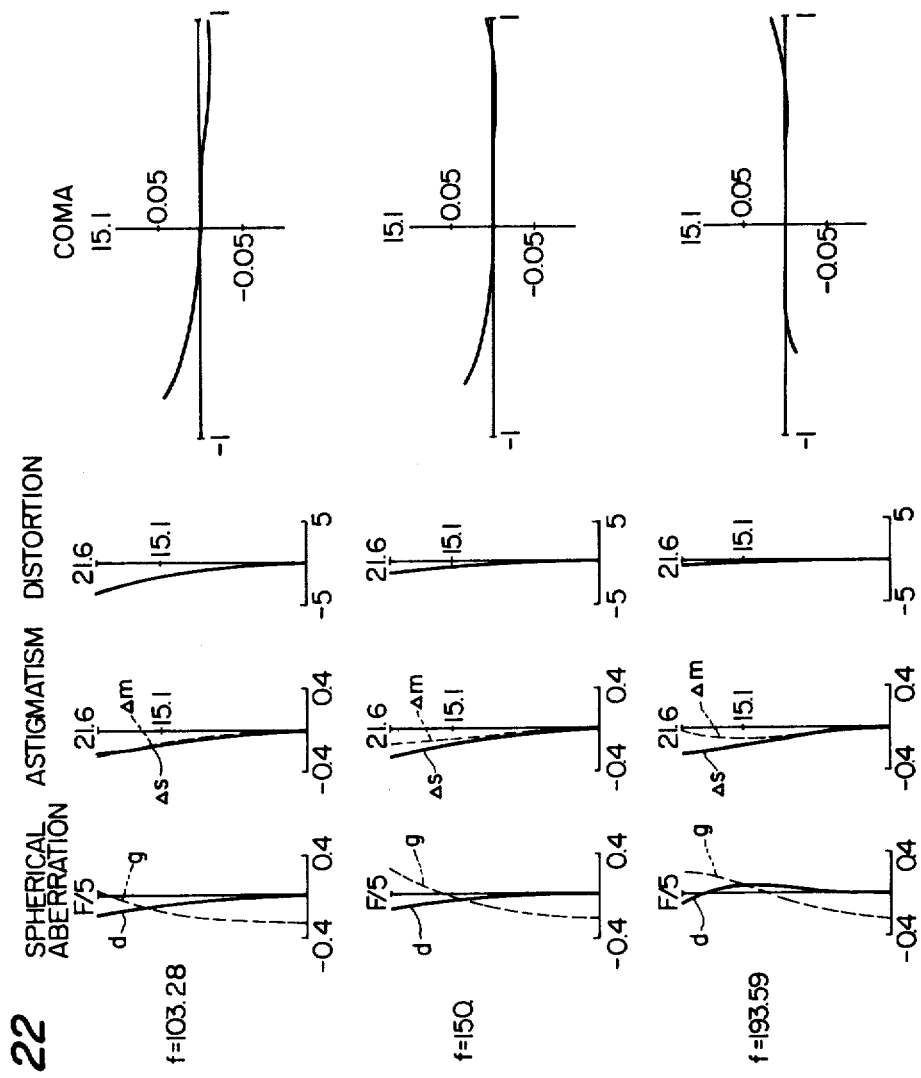
Figure 23:
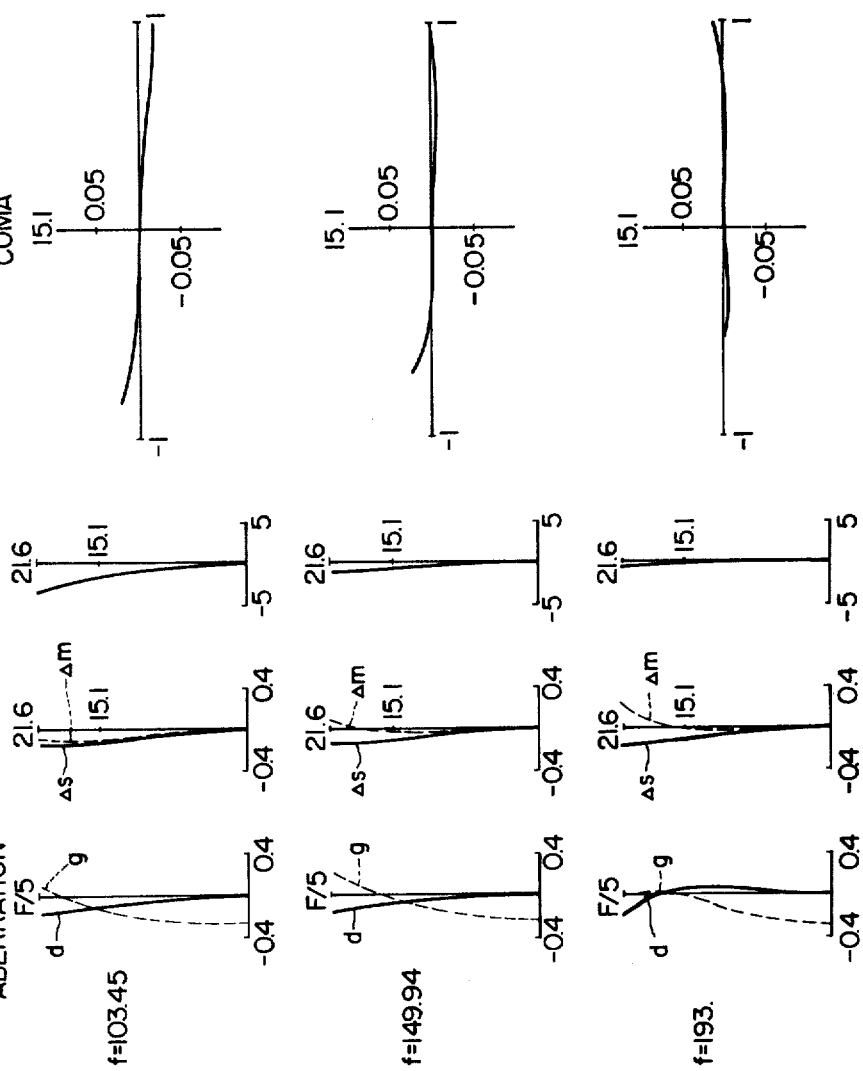

Out of the above-mentioned embodiments, Embodiments 1 through 10 respectively have lens configuration as shown in FIG. 3, i.e., the first lens group I comprises a cemented doublet consisting of a positive lens element and negative lens element, the second lens group II comprises a negative single lens and cemented doublet which consists of a negative lens element and positive lens element, the third lens group III comprises a cemented doublet consisting of a negative lens element and positive lens element, and the fourth lens group IV comprises a positive lens, negative lens and positive meniscus lens. Embodiments 11 through 16 respectively have lens configuration as shown in FIG. 4, i.e., the second lens group II comprises a cemented doublet consisting of a negative lens element and positive lens element. Embodiments 17 and 18 respectively have lens configuration as shown in FIG. 5, i.e., the second lens group II comprises a cemented doublet consisting of a negative lens element and positive lens element, and the fourth lens group IV comprises a positive lens and negative lens.

We claim:

1. A bright and compact optical-compensation type zoom lens system comprising a first lens group I having positive refractive power, a second lens group II having negative refractive power, a third lens group III having positive refractive power, and a fourth lens group IV having positive refractive power, said zoom lens system being arranged to carry out zooming by keeping said second lens group II and said fourth lens group IV fixed and integrally moving said first lens group I and said third lens group III, said first lens group I comprising a cemented doublet consisting of a positive lens element and negative lens element, said second lens group II comprising at least one positive lens element and at least one negative lens element and comprising a cemented doublet having the surface on the object side thereof concave toward the object side, said third lens group III comprising a cemented doublet consisting of a positive lens element and negative lens element, said fourth lens group IV comprising at least one positive lens component and at least one negative lens component, said zoom lens system satisfying the following conditions (1) through (6):

$$0.5F_W < |F_{II}| < 1.0F_W \tag{1}$$

$$0.6F_W < F_{III} < 1.5F_W \tag{2}$$

$$0.6F_W < r_{I\text{-}1} < 2.0F_W \tag{3}$$

$$0.4F_W < |r_{II}| < 1.2F_W \tag{4}$$

$$\Delta \overline{N}_{II} + \Delta \overline{N}_{III} \leq 0.4 \tag{5}$$

$$\Delta v_I > 15 \tag{6}$$

wherein reference symbol $F_W$ represents the shortest focal length of the lens system as a whole, reference symbol $F_{II}$ represents the focal length of the second lens group II, reference symbol $F_{III}$ represents the focal length of the third lens group III, reference symbol $r_{I\text{-}1}$ represents the radius of curvature of the surface on the object side of the first lens group I, reference symbol $r_{II}$ represents the radius of curvature of the surface on the object side of the cemented doublet constituting the second lens group II, reference symbol $\Delta \overline{N}_{II}$ represents the difference between the mean value $\overline{N}'_{II}$ of refractive indices of positive lenses constituting the second lens group II and mean value $\overline{N}''_{II}$ of refractive indices of negative lenses constituting the second lens group II, reference symbol $\Delta \overline{N}_{III}$ represents the difference between the mean value $\overline{N}''_{III}$ of refractive indices of negative lenses constituting the third lens group III and mean value $\overline{N}'_{III}$ of refractive indices of positive lenses constituting the third lens group III, and reference symbol $\Delta v_I$ represents the value obtained by subtracting the Abbe's number $v''_I$ of the negative lens constituting the first lens group I from the Abbe's number $v'_I$ of the positive lens constituting the first lens group I.

2. A bright and compact optical-compensation type zoom lens system according to claim 1 further satisfying the following condition (7):

$$0.6 < |r_{III\text{-}1}/r_{III\text{-}2}| < 2.5 \tag{7}$$

wherein reference symbols $r_{III\text{-}1}$ and $r_{III\text{-}2}$ respectively represent radii of curvature of the surface on the object side and cemented surface of the cemented doublet constituting the third lens group III.

3. A bright and compact optical-compensation type zoom lens system according to claim 2 further satisfying the following condition (8):

$$|r_{I\text{-}2}| > 0.4F_W \tag{8}$$

wherein reference symbol $r_{I-2}$ represents the radius of curvature of the cemented surface of the cemented doublet constituting the first lens group I.

4. A bright and compact optical-compensation type zoom lens system according to claim 3 further satisfying the following conditions (9) and (10):

$$\overline{N}_{IV} > 1.5 \qquad (9)$$

$$\overline{N}_I > 1.5 \qquad (10)$$

wherein reference symbol $\overline{N}_I$ represents the mean value of refractive indices of respective lenses constituting the first lens group I, and reference symbol $\overline{N}_{IV}$ represents the mean value of refractive indices of respective lenses constituting the fourth lens group IV.

5. A bright and compact optical-compensation type zoom lens system according to claim 1, in which said first lens group I comprises a cemented doublet consisting of a positive lens element and negative lens element, said second lens group II comprises a negative lens component and a cemented doublet consisting of a negative lens element and positive lens element, said third lens group III comprises a cemented doublet consisting of a negative lens element and positive lens element, and said fourth lens group IV comprises a positive lens component, negative lens component and positive lens component.

6. A bright and compact optical-compensation type zoom lens system according to claim 5, in which said zoom lens system having the following numerical data:

| | | | |
|---|---|---|---|
| $r_1 = 106.068$ | | | |
| | $d_1 = 8.16$ | $n_1 = 1.63854$ | $\nu_1 = 55.4$ |
| $r_2 = -89.917$ | | | |
| | $d_2 = 2.56$ | $n_2 = 1.6398$ | $\nu_2 = 34.5$ |
| $r_3 = 430.595$ | | | |
| | $d_3 = D_1$ (variable) | | |
| $r_4 = 630.592$ | | | |
| | $d_4 = 1.58$ | $n_3 = 1.47069$ | $\nu_3 = 67.4$ |
| $r_5 = 53.66$ | | | |
| | $d_5 = 5.28$ | | |
| $r_6 = -51.723$ | | | |
| | $d_6 = 1.49$ | $n_4 = 1.56873$ | $\nu_4 = 63.2$ |
| $r_7 = 57.981$ | | | |
| | $d_7 = 6.4$ | $n_5 = 1.64769$ | $\nu_5 = 33.8$ |
| $r_8 = -167.369$ | | | |
| | $d_8 = D_2$ (variable) | | |
| $r_9 = 97.414$ | | | |
| | $d_9 = 1.51$ | $n_6 = 1.80518$ | $\nu_6 = 25.4$ |
| $r_{10} = 42.127$ | | | |
| | $d_{10} = 7.99$ | $n_7 = 1.64328$ | $\nu_7 = 47.9$ |
| $r_{11} = -90.745$ | | | |
| | $d_{11} = D_3$ (variable) | | |
| $r_{12} = 53.361$ | | | |
| | $d_{12} = 3.89$ | $n_8 = 1.617$ | $\nu_8 = 62.8$ |
| $r_{13} = 2063.483$ | | | |
| | $d_{13} = 5.93$ | | |
| $r_{14} = -72.391$ | | | |
| | $d_{14} = 2.09$ | $n_9 = 1.56732$ | $\nu_9 = 42.8$ |
| $r_{15} = 59.667$ | | | |
| | $d_{15} = 7.4$ | | |
| $r_{16} = -75.87$ | | | |
| | $d_{16} = 5.74$ | $n_{10} = 1.6516$ | $\nu_{10} = 58.7$ |
| $r_{17} = -43.246$ | | | |

| F | $D_1$ | $D_2$ | $D_3$ |
|---|---|---|---|
| 102.57 | 5.616 | 37.409 | 6.759 |
| 147.62 | 26.691 | 16.335 | 27.833 |
| 193 | 41.826 | 1.199 | 42.968 |
| $F_{II} = -0.714F_W$ | | $F_{III} = 0.86F_W$ | |
| $r_{I\text{-}1} = 1.034F_W$ | | $|r_{II}| = 0.504F_W$ | |
| $\Delta N_{II} + \Delta N_{III} = 0.28988$ | | $\Delta \nu_I = 20.9$ | | wherein reference symbols $r_1$, $r_2$, ... respectively represent radii of curvature of respective lens surfaces, reference symbols $d_1$, $d_2$, ... respectively represent thicknesses of respective lenses and airspaces between respective lenses, reference symbols $n_1$, $n_2$, ... respectively represent refractive indices of respective lenses, reference symbols $\nu_1$, $\nu_2$, ... respectively represent Abbe's numbers of respective lenses, and reference symbol F represents the focal length of the lens system as a whole.

7. A bright and compact optical-compensation type zoom lens system according to claim 5, in which said zoom lens system having the following numerical data:

| | | | |
|---|---|---|---|
| $r_1 = 105.22$ | | | |
| | $d_1 = 8.27$ | $n_1 = 1.6935$ | $\nu_1 = 53.2$ |
| $r_2 = -116.871$ | | | |
| | $d_2 = 2.56$ | $n_2 = 1.6727$ | $\nu_2 = 32.1$ |
| $r_3 = 294.901$ | | | |
| | $d_3 = D_1$ (variable) | | |
| $r_4 = 459.551$ | | | |
| | $d_4 = 1.58$ | $n_3 = 1.47069$ | $\nu_3 = 67.4$ |
| $r_5 = 55.4$ | | | |
| | $d_5 = 5.29$ | | |
| $r_6 = -49.782$ | | | |
| | $d_6 = 1.49$ | $n_4 = 1.56873$ | $\nu_4 = 63.2$ |
| $r_7 = 68.045$ | | | |
| | $d_7 = 6.33$ | $n_5 = 1.6398$ | $\nu_5 = 34.5$ |
| $r_8 = -157.932$ | | | |
| | $d_8 = D_2$ (variable) | | |
| $r_9 = 100.383$ | | | |
| | $d_9 = 1.51$ | $n_6 = 1.80518$ | $\nu_6 = 25.4$ |
| $r_{10} = 45.145$ | | | |
| | $d_{10} = 8.13$ | $n_7 = 1.64328$ | $\nu_7 = 47.9$ |
| $r_{11} = -90.856$ | | | |
| | $d_{11} = D_3$ (variable) | | |
| $r_{12} = 51.818$ | | | |
| | $d_{12} = 4.54$ | $n_8 = 1.6935$ | $\nu_8 = 53.2$ |
| $r_{13} = 127.254$ | | | |
| | $d_{13} = 7.1$ | | |
| $r_{14} = -283.406$ | | | |
| | $d_{14} = 2.78$ | $n_9 = 1.59551$ | $\nu_9 = 39.2$ |
| $r_{15} = 53.47$ | | | |
| | $d_{15} = 8.59$ | | |
| $r_{16} = 361.809$ | | | |
| | $d_{16} = 6.61$ | $n_{10} = 1.6935$ | $\nu_{10} = 53.2$ |
| $r_{17} = -161.703$ | | | |

| F | $D_1$ | $D_2$ | $D_3$ |
|---|---|---|---|
| 102.58 | 4.714 | 37.563 | 3.119 |
| 147.62 | 25.789 | 16.489 | 24.193 |
| 193 | 40.924 | 1.353 | 39.328 |
| $F_{II} = -0.714F_W$ | | $F_{III} = 0.86F_W$ | |
| $r_{I\text{-}1} = 1.026F_W$ | | $|r_{II}| = 0.485F_W$ | |
| $\Delta N_{II} + \Delta N_{III} = 0.28199$ | | $\Delta \nu_I = 21.1$ | | wherein reference symbols $r_1$, $r_2$, ... respectively represent radii of curvature of respective lens surfaces, reference symbols $d_1$, $d_2$, ... respectively represent thicknesses of respective lenses and airspaces between respective lenses, reference symbols $n_1$, $n_2$, ... respectively represent refractive indices of respective lenses, reference symbols $\nu_1$, $\nu_2$, ... respectively represent Abbe's numbers of respective lenses, and reference symbol F represents the focal length of the lens system as a whole.

8. A bright and compact optical-compensation type zoom lens system according to claim 5, in which said zoom lens system having the following numerical data:

| | | | |
|---|---|---|---|
| $r_1 = 83.719$ | | | |
| | $d_1 = 7.8$ | $n_1 = 1.60311$ | $\nu_1 = 60.7$ |

-continued $r_2 = -178.01$
$\quad d_2 = 2.49 \quad n_2 = 1.59551 \quad \nu_2 = 39.2$
$r_3 = 213.01$
$\quad d_3 = D_1$ (variable)
$r_4 = 127.605$
$\quad d_4 = 1.58 \quad n_3 = 1.47069 \quad \nu_3 = 67.4$
$r_5 = 50.027$
$\quad d_5 = 5.63$
$r_6 = -52.717$
$\quad d_6 = 1.49 \quad n_4 = 1.56873 \quad \nu_4 = 63.2$
$r_7 = 76.081$
$\quad d_7 = 6.3 \quad n_5 = 1.68893 \quad \nu_5 = 31.1$
$r_8 = -516.424$
$\quad d_8 = D_2$ (variable)
$r_9 = 95.301$
$\quad d_9 = 1.51 \quad n_6 = 1.80518 \quad \nu_6 = 25.4$
$r_{10} = 44.296$
$\quad d_{10} = 8.23 \quad n_7 = 1.62299 \quad \nu_7 = 58.1$
$r_{11} = -86.766$
$\quad d_{11} = D_3$ (variable)
$r_{12} = 45.454$
$\quad d_{12} = 4.71 \quad n_8 = 1.72 \quad \nu_8 = 46$
$r_{13} = 105.219$
$\quad d_{13} = 9.32$
$r_{14} = -2263.939$
$\quad d_{14} = 3.22 \quad n_9 = 1.66755 \quad \nu_9 = 41.9$
$r_{15} = 43.134$
$\quad d_{15} = 9.05$
$r_{16} = 95.423$
$\quad d_{16} = 4.43 \quad n_{10} = 1.62012 \quad \nu_{10} = 49.7$
$r_{17} = -2903.76$

| F | $D_1$ | $D_2$ | $D_3$ |
|---|---|---|---|
| 102.71 | 1.879 | 39.428 | 13.804 |
| 147.8 | 22.954 | 18.354 | 34.878 |
| 193.23 | 38.089 | 3.218 | 50.013 |

$F_{II} = -0.713F_W \quad F_{III} = 0.859F_W$
$r_{I-1} = 0.815F_W \quad |r_{III}| = 0.513F_W$
$\Delta N_{II} + \Delta N_{III} = 0.35141 \quad \Delta \nu_I = 21.5$ wherein reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, reference symbols $\nu_1, \nu_2, \ldots$ respectively represent Abbe's numbers of respective lenses, and reference symbol F represents the focal length of the lens system as a whole.

9. A bright and compact optical-compensation type zoom lens system according to claim 5, in which said zoom lens system having the following numerical data:

$r_1 = 89.93$
$\quad d_1 = 2.49 \quad n_1 = 1.64769 \quad \nu_1 = 33.8$
$r_2 = 47.682$
$\quad d_2 = 6.74 \quad n_2 = 1.6516 \quad \nu_2 = 58.7$
$r_3 = 231.179$
$\quad d_3 = D_1$ (variable)
$r_4 = -266$
$\quad d_4 = 1.58 \quad n_3 = 1.51633 \quad \nu_3 = 64.2$
$r_5 = 74.861$
$\quad d_5 = 5.23$
$r_6 = -51.543$
$\quad d_6 = 1.58 \quad n_4 = 1.691 \quad \nu_4 = 54.8$
$r_7 = 129.457$
$\quad d_7 = 4.88 \quad n_5 = 1.68893 \quad \nu_5 = 31.1$
$r_8 = -84.447$
$\quad d_8 = D_2$ (variable)
$r_9 = 157.408$
$\quad d_9 = 1.51 \quad n_6 = 1.7847 \quad \nu_6 = 26.2$
$r_{10} = 48.608$
$\quad d_{10} = 7.36 \quad n_7 = 1.72 \quad \nu_7 = 50.3$
$r_{11} = -91.938$
$\quad d_{11} = D_3$ (variable)
$r_{12} = 57.692$
$\quad d_{12} = 5.19 \quad n_8 = 1.6968 \quad \nu_8 = 55.5$
$r_{13} = 171.955$
$\quad d_{13} = 8.55$
$r_{14} = -131.619$
$\quad d_{14} = 3.11 \quad n_9 = 1.57501 \quad \nu_9 = 41.5$
$r_{15} = 68.064$
$\quad d_{15} = 8.8$
$r_{16} = 1663.829$
$\quad d_{16} = 5.19 \quad n_{10} = 1.67 \quad \nu_{10} = 51.6$
$r_{17} = -124.903$

| F | $D_1$ | $D_2$ | $D_3$ |
|---|---|---|---|
| 102.58 | 6.698 | 36.823 | 14.306 |
| 147.62 | 27.773 | 15.749 | 35.38 |
| 193 | 42.908 | 0.613 | 50.515 |

$F_{II} = -0.714F_W \quad F_{III} = 0.86F_W$
$r_{I-1} = 0.877F_W \quad |r_{III}| = 0.502F_W$
$\Delta N_{II} + \Delta N_{III} = 0.14997 \quad \Delta \nu_I = 24.9$ wherein reference symbols $r_1, r_2, \ldots$ respectively represent radii of curvative of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, reference symbols $\nu_1, \nu_2, \ldots$ respectively Abbe's numbers of respective lenses, and reference symbol F represents the focal length of the lens system as a whole.

10. A bright and compact optical-compensation type zoom lens system according to claim 5, in which said zoom lens system having the following numerical data:

$r_1 = 133.067$
$\quad d_1 = 3.00 \quad n_1 = 1.64769 \quad \nu_1 = 33.8$
$r_2 = 65.29$
$\quad d_2 = 6.00 \quad n_2 = 1.6516 \quad \nu_2 = 58.7$
$r_3 = 562.205$
$\quad d_3 = D_1$ (variable)
$r_4 = -217.465$
$\quad d_4 = 2.00 \quad n_3 = 1.51633 \quad \nu_3 = 64.2$
$r_5 = 105.496$
$\quad d_5 = 4.00$
$r_6 = -76.869$
$\quad d_6 = 2.00 \quad n_4 = 1.691 \quad \nu_4 = 54.8$
$r_7 = 120.854$
$\quad d_7 = 4.81 \quad n_5 = 1.68893 \quad \nu_5 = 31.1$
$r_8 = -130.195$
$\quad d_8 = D_2$ (variable)
$r_9 = 174.709$
$\quad d_9 = 1.92 \quad n_6 = 1.78472 \quad \nu_6 = 25.7$
$r_{10} = 66.198$
$\quad d_{10} = 8.00 \quad n_7 = 1.691 \quad \nu_7 = 54.8$
$r_{11} = -115.764$
$\quad d_{11} = D_3$ (variable)
$r_{12} = 34.949$
$\quad d_{12} = 5.05 \quad n_8 = 1.63854 \quad \nu_8 = 55.4$
$r_{13} = 88.396$
$\quad d_{13} = 5.72$
$r_{14} = -336.049$
$\quad d_{14} = 3.4 \quad n_9 = 1.56732 \quad \nu_9 = 42.8$
$r_{15} = 35.326$
$\quad d_{15} = 5.89$
$r_{16} = 267.612$
$\quad d_{16} = 5.45 \quad n_{10} = 1.62299 \quad \nu_{10} = 58.1$
$r_{17} = -112.548$

| F | $D_1$ | $D_2$ | $D_3$ |
|---|---|---|---|
| 102.69 | 2.6 | 48.162 | 24.166 |
| 144.97 | 27.831 | 22.931 | 49.397 |
| 193.4 | 48.533 | 2.229 | 70.099 |

$F_{II} = -0.905F_W \quad F_{III} = 1.09F_W$
$r_{I-1} = 1.296F_W \quad |r_{III}| = 0.749F_W$ -continued

| $\Delta \overline{N}_{II} + \Delta \overline{N}_{III} = 0.17899$ | $\Delta \nu_I = 24.9$ |
|---|---| wherein reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, reference symbols $\nu_1, \nu_2, \ldots$ respectively represent Abbe's numbers of respective lenses, and reference symbol F represents the focal length of the lens system as a whole.

11. A bright and compact optical-compensation type zoom lens system according to claim 5, in which said zoom lens system having the following numerical data:

$r_1 = 112.279$
$d_1 = 3.00$  $n_1 = 1.64769$  $\nu_1 = 33.8$
$r_2 = 65.37$
$d_2 = 6.00$  $n_2 = 1.6516$  $\nu_2 = 58.7$
$r_3 = 310.971$
$d_3 = D_1$ (variable)
$r_4 = -303.957$
$d_4 = 2.00$  $n_3 = 1.51633$  $\nu_3 = 64.2$
$r_5 = 95.796$
$d_5 = 4.00$
$r_6 = -72.999$
$d_6 = 2.00$  $n_4 = 1.691$  $\nu_4 = 54.8$
$r_7 = 120.852$
$d_7 = 4.81$  $n_5 = 1.68893$  $\nu_5 = 31.1$
$r_8 = -123.895$
$d_8 = D_2$ (variable)
$r_9 = 173.609$
$d_9 = 1.92$  $n_6 = 1.78472$  $\nu_6 = 25.7$
$r_{10} = 59.603$
$d_{10} = 8.00$  $n_7 = 1.691$  $\nu_7 = 54.8$
$r_{11} = -113.364$
$d_{11} = D_3$ (variable)
$r_{12} = 32.184$
$d_{12} = 5.05$  $n_8 = 1.63854$  $\nu_8 = 55.4$
$r_{13} = 62.499$
$d_{13} = 5.72$
$r_{14} = -2741.179$
$d_{14} = 3.4$  $n_9 = 1.56732$  $\nu_9 = 42.8$
$r_{15} = 32.061$
$d_{15} = 5.89$
$r_{16} = 87.089$
$d_{16} = 5.45$  $n_{10} = 1.61484$  $\nu_{10} = 51.2$
$r_{17} = -270.876$

| F | $D_1$ | $D_2$ | $D_3$ |
|---|---|---|---|
| 102.69 | 1.255 | 48.139 | 24.332 |
| 144.97 | 26.486 | 22.908 | 49.563 |
| 193.4 | 47.188 | 2.206 | 70.265 |

| $F_{II} = -0.905F_W$ | $F_{III} = 1.09F_W$ |
|---|---|
| $r_{I-1} = 1.093F_W$ | $\|r_{III}\| = 0.711F_W$ |
| $\Delta \overline{N}_{II} + \Delta \overline{N}_{III} = 0.17899$ | $\Delta \nu_I = 24.9$ | wherein reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, reference symbols $\nu_1, \nu_2, \ldots$ respectively represent Abbe's numbers of respective lenses, and reference symbol F represents the focal length of the lens system as a whole.

12. A bright and compact optical-compensation type zoom lens system according to claim 5, in which said zoom lens system having the following numerical data:

$r_1 = 132.817$
$d_1 = 3.00$  $n_1 = 1.64769$  $\nu_1 = 33.8$
$r_2 = 65.29$
$d_2 = 6.00$  $n_2 = 1.6516$  $\nu_2 = 58.7$
$r_3 = 557.645$
$d_3 = D_1$ (variable)
$r_4 = -229.584$
$d_4 = 2.00$  $n_3 = 1.56873$  $\nu_3 = 63.2$
$r_5 = 110.963$
$d_5 = 4.00$
$r_6 = -73.683$
$d_6 = 2.00$  $n_4 = 1.755$  $\nu_4 = 52.3$
$r_7 = 434.45$
$d_7 = 5.00$  $n_5 = 1.7552$  $\nu_5 = 27.5$
$r_8 = -112.23$
$d_8 = D_2$ (variable)
$r_9 = 176.246$
$d_9 = 1.92$  $n_6 = 1.78472$  $\nu_6 = 25.7$
$r_{10} = 65.907$
$d_{10} = 8.00$  $n_7 = 1.6935$  $\nu_7 = 53.2$
$r_{11} = -116.042$
$d_{11} = D_3$ (variable)
$r_{12} = 36.32$
$d_{12} = 5.05$  $n_8 = 1.63854$  $\nu_8 = 55.4$
$r_{13} = 108.169$
$d_{13} = 5.72$
$r_{14} = -243.74$
$d_{14} = 3.4$  $n_9 = 1.56732$  $\nu_9 = 42.8$
$r_{15} = 36.744$
$d_{15} = 5.89$
$r_{16} = 1812.39$
$d_{16} = 5.45$  $n_{10} = 1.62299$  $\nu_{10} = 58.1$
$r_{17} = -90.179$

| F | $D_1$ | $D_2$ | $D_3$ |
|---|---|---|---|
| 102.69 | 3.249 | 47.493 | 24.121 |
| 144.97 | 28.48 | 22.262 | 49.352 |
| 193.4 | 49.182 | 1.56 | 70.054 |

| $F_{II} = -0.905F_W$ | $F_{III} = 1.09F_W$ |
|---|---|
| $r_{I-1} = 1.293F_W$ | $\|r_{III}\| = 0.718F_W$ |
| $\Delta \overline{N}_{II} + \Delta \overline{N}_{III} = 0.17899$ | $\Delta \nu_I = 24.9$ | wherein reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, reference symbols $\nu_1, \nu_2, \ldots$ respectively represent Abbe's numbers of respective lenses, and reference symbol F represents the focal length of the lens system as a whole.

13. A bright and compact optical-compensation type zoom lens system according to claim 5, in which said zoom lens system having the following numerical data:

$r_1 = 83.643$
$d_1 = 6.74$  $n_1 = 1.6516$  $\nu_1 = 58.7$
$r_2 = -212.523$
$d_2 = 2.49$  $n_2 = 1.64769$  $\nu_2 = 33.8$
$r_3 = 191.847$
$d_3 = D_1$ (variable)
$r_4 = -315.514$
$d_4 = 1.58$  $n_3 = 1.51633$  $\nu_3 = 64.2$
$r_5 = 73.972$
$d_5 = 5.23$
$r_6 = -50.788$
$d_6 = 1.58$  $n_4 = 1.691$  $\nu_4 = 54.8$
$r_7 = 129.475$
$d_7 = 4.88$  $n_5 = 1.68893$  $\nu_5 = 31.1$
$r_8 = -84.647$
$d_8 = D_2$ (variable)
$r_9 = 154.659$ -continued

| | | |
|---|---|---|
| $d_9 = 1.51$ | $n_6 = 1.78472$ | $\nu_6 = 25.7$ |
| $r_{10} = 45.712$ | | |
| $d_{10} = 7.36$ | $n_7 = 1.717$ | $\nu_7 = 47.9$ |
| $r_{11} = -90.848$ | | |
| $d_{11} = D_3$ (variable) | | |
| $r_{12} = 54.9$ | | |
| $d_{12} = 5.19$ | $n_8 = 1.6935$ | $\nu_8 = 53.2$ |
| $r_{13} = 136.19$ | | |
| $d_{13} = 8.55$ | | |
| $r_{14} = -180.558$ | | |
| $d_{14} = 3.11$ | $n_9 = 1.60717$ | $\nu_9 = 40.3$ |
| $r_{15} = 62.987$ | | |
| $d_{15} = 8.8$ | | |
| $r_{16} = 206.328$ | | |
| $d_{16} = 5.15$ | $n_{10} = 1.697$ | $\nu_{10} = 48.5$ |
| $r_{17} = -227.955$ | | |

| F | $D_1$ | $D_2$ | $D_3$ |
|---|---|---|---|
| 102.58 | 5.936 | 36.92 | 14.577 |
| 147.62 | 27.011 | 15.846 | 35.651 |
| 193 | 42.146 | 0.71 | 50.786 |

$F_{II} = -0.714 F_W$     $F_{III} = 0.86 F_W$
$r_{I-1} = 0.815 F_W$     $|r_{II}| = 0.495 F_W$
$\Delta \overline{N}_{II} + \Delta \overline{N}_{III} = 1.5299$     $\Delta \nu_I = 24.9$ wherein reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, reference symbols $\nu_1, \nu_2, \ldots$ respectively represent Abbe's numbers of respective lenses, and reference symbol F represents the focal length of the lens system as a whole.

14. A bright and compact optical-compensation type zoom lens system according to claim 5, in which said zoom lens system having the following numerical data:

| | | |
|---|---|---|
| $r_1 = 110.546$ | | |
| $d_1 = 8.00$ | $n_1 = 1.60311$ | $\nu_1 = 60.7$ |
| $r_2 = -109.204$ | | |
| $d_2 = 2.49$ | $n_2 = 1.5927$ | $\nu_2 = 35.3$ |
| $r_3 = 589.506$ | | |
| $d_3 = D_1$ (variable) | | |
| $r_4 = 531.834$ | | |
| $d_4 = 1.58$ | $n_3 = 1.47069$ | $\nu_3 = 67.4$ |
| $r_5 = 55.243$ | | |
| $d_5 = 5.23$ | | |
| $r_6 = -50.403$ | | |
| $d_6 = 1.49$ | $n_4 = 1.56873$ | $\nu_4 = 63.2$ |
| $r_7 = 48.592$ | | |
| $d_7 = 6.3$ | $n_5 = 1.61293$ | $\nu_5 = 37$ |
| $r_8 = -146.241$ | | |
| $d_8 = D_2$ (variable) | | |
| $r_9 = 95.275$ | | |
| $d_9 = 1.51$ | $n_6 = 1.80518$ | $\nu_6 = 25.4$ |
| $r_{10} = 42.377$ | | |
| $d_{10} = 8.00$ | $n_7 = 1.64328$ | $\nu_7 = 47.9$ |
| $r_{11} = -93.466$ | | |
| $d_{11} = D_3$ (variable) | | |
| $r_{12} = 57.906$ | | |
| $d_{12} = 3.53$ | $n_8 = 1.72916$ | $\nu_8 = 54.7$ |
| $r_{13} = 81.621$ | | |
| $d_{13} = 5.73$ | | |
| $r_{14} = -46.913$ | | |
| $d_{14} = 2.04$ | $n_9 = 1.59551$ | $\nu_9 = 39.2$ |
| $r_{15} = 110.375$ | | |
| $d_{15} = 5.9$ | | |
| $r_{16} = 1179.425$ | | |
| $d_{16} = 4.5$ | $n_{10} = 1.72916$ | $\nu_{10} = 54.7$ |
| $r_{17} = -49.279$ | | |

| F | $D_1$ | $D_2$ | $D_3$ |
|---|---|---|---|
| 102.55 | 6.315 | 37.547 | 24.17 |
| 147.63 | 27.39 | 16.5 | 45.426 |
| 193 | 42.525 | 1.364 | 60.381 |

$F_{II} = -0.714 F_W$     $F_{III} = 0.852 F_W$
$r_{I-1} = 1.078 F_W$     $|r_{II}| = 0.491 F_W$
$\Delta \overline{N}_{II} + \Delta \overline{N}_{III} = 0.25512$     $\Delta \nu_I = 25.4$ wherein reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, reference symbols $\nu_1, \nu_2, \ldots$ respectively represent Abbe's numbers of respective lenses, and reference symbol F represents the focal length of the lens system as a whole.

15. A bright and compact optical-compensation type zoom lens system according to claim 5, in which said zoom lens system having the following numerical data:

| | | |
|---|---|---|
| $r_1 = 105.943$ | | |
| $d_1 = 8.16$ | $n_1 = 1.641$ | $\nu_1 = 56.9$ |
| $r_2 = -88.174$ | | |
| $d_2 = 2.56$ | $n_2 = 1.6398$ | $\nu_2 = 34.5$ |
| $r_3 = 413.942$ | | |
| $d_3 = D_1$ (variable) | | |
| $r_4 = 592.383$ | | |
| $d_4 = 1.58$ | $n_3 = 1.47069$ | $\nu_3 = 67.4$ |
| $r_5 = 52.878$ | | |
| $d_5 = 5.28$ | | |
| $r_6 = -50.695$ | | |
| $d_6 = 1.49$ | $n_4 = 1.56384$ | $\nu_4 = 60.7$ |
| $r_7 = 58.485$ | | |
| $d_7 = 6.39$ | $n_5 = 1.64769$ | $\nu_5 = 33.8$ |
| $r_8 = -162.423$ | | |
| $d_8 = D_2$ (variable) | | |
| $r_9 = 98.044$ | | |
| $d_9 = 1.51$ | $n_6 = 1.78472$ | $\nu_6 = 25.7$ |
| $r_{10} = 41.174$ | | |
| $d_{10} = 8.01$ | $n_7 = 1.6393$ | $\nu_7 = 44.9$ |
| $r_{11} = -90.784$ | | |
| $d_{11} = D_3$ (variable) | | |
| $r_{12} = 52.793$ | | |
| $d_{12} = 3.95$ | $n_8 = 1.617$ | $\nu_8 = 62.8$ |
| $r_{13} = 495.894$ | | |
| $d_{13} = 6.01$ | | |
| $r_{14} = -79.838$ | | |
| $d_{14} = 2.16$ | $n_9 = 1.5814$ | $\nu_9 = 40.8$ |
| $r_{15} = 61.776$ | | |
| $d_{15} = 7.38$ | | |
| $r_{16} = -93.198$ | | |
| $d_{16} = 5.59$ | $n_{10} = 1.6516$ | $\nu_{10} = 58.7$ |
| $r_{17} = -47.068$ | | |

| F | $D_1$ | $D_2$ | $D_3$ |
|---|---|---|---|
| 102.57 | 5.641 | 37.314 | 6.823 |
| 147.62 | 26.716 | 16.24 | 27.897 |
| 193 | 41.851 | 1.104 | 43.032 |

$F_{II} = -0.714 F_W$     $F_{III} = 0.86 F_W$
$r_{I-1} = 1.033 F_W$     $|r_{II}| = 0.494 F_W$
$\Delta \overline{N}_{II} + \Delta \overline{N}_{III} = 0.27585$     $\Delta \nu_I = 22.4$ wherein reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, reference symbols $\nu_1, \nu_2, \ldots$ respectively represent Abbe's numbers of respective lenses, and reference symbol F represents the focal length of the lens system as a whole.

16. A bright and compact optical-compensation type zoom lens system according to claim 1, in which said first lens group I comprises a cemented doublet consisting of a positive lens element and negative lens element, said second lens group II comprises a cemented doublet consisting of a negative lens element and positive lens element, said third lens group III comprises a cemented doublet consisting of a negative lens element and positive lens element, said fourth lens group IV comprises a positive lens component, negative lens component and positive lens component.

17. A bright and compact optical-compensation type zoom lens system according to claim 16, in which said zoom lens system having the following numerical data:

| $r_1 = 96.385$ | | | |
|---|---|---|---|
| $d_1 = 8.12$ | | $n_1 = 1.6935$ | $v_1 = 53.2$ |
| $r_2 = -147.812$ | | | |
| $d_2 = 2.54$ | | $n_2 = 1.68893$ | $v_2 = 31.1$ |
| $r_3 = 265.59$ | | | |
| $d_3 = D_1$ (variable) | | | |
| $r_4 = -89.008$ | | | |
| $d_4 = 2.01$ | | $n_3 = 1.72$ | $v_3 = 46.0$ |
| $r_5 = 32.669$ | | | |
| $d_5 = 5.13$ | | $n_4 = 1.80518$ | $v_4 = 25.4$ |
| $r_6 = 94.807$ | | | |
| $d_6 = D_2$ (variable) | | | |
| $r_7 = 65.425$ | | | |
| $d_7 = 1.46$ | | $n_5 = 1.78472$ | $v_5 = 25.7$ |
| $r_8 = 37.457$ | | | |
| $d_8 = 9.35$ | | $n_6 = 1.51112$ | $v_6 = 60.5$ |
| $r_9 = -70.214$ | | | |
| $d_9 = D_3$ (variable) | | | |
| $r_{10} = 65.873$ | | | |
| $d_{10} = 4.69$ | | $n_7 = 1.6935$ | $v_7 = 53.2$ |
| $r_{11} = -155.394$ | | | |
| $d_{11} = 6.72$ | | | |
| $r_{12} = -43.123$ | | | |
| $d_{12} = 1.57$ | | $n_8 = 1.56444$ | $v_8 = 43.8$ |
| $r_{13} = 68.728$ | | | |
| $d_{13} = 5.44$ | | | |
| $r_{14} = -36.524$ | | | |
| $d_{14} = 5.19$ | | $n_9 = 1.72$ | $v_9 = 50.3$ |
| $r_{15} = -29.335$ | | | |

| F | $D_1$ | $D_2$ | $D_3$ |
|---|---|---|---|
| 102.43 | 5.723 | 40.817 | 5.099 |
| 147.68 | 26.045 | 20.495 | 25.421 |
| 193 | 40.64 | 5.9 | 40.016 |

| $F_{II} = -0.689F_W$ | $F_{III} = 0.831F_W$ |
|---|---|
| $r_{I-1} = 0.941F_W$ | $\|r_{II}\| = 0.869F_W$ |
| $\Delta \overline{N}_{II} + \Delta \overline{N}_{III} = 0.35878$ | $\Delta v_I = 22.1$ | wherein reference symbols $r_1$, $r_2$, ... respectively represent radii of curvature of respective lens surfaces, reference symbols $d_1$, $d_2$, ... respectively represent thicknesses of respective lenses and airspaces between respective lenses, reference symbols $n_1$, $n_2$, ... respectively represent refractive indices of respective lenses, reference symbols $v_1$, $v_2$, ... respectively represent Abbe's numbers of respective lenses, and reference symbol F represents the focal length of the lens system as whole.

18. A bright and compact optical-compensation type zoom lens system according to claim 16, in which said zoom lens system having the following numerical data:

| $r_1 = 90$ | | | |
|---|---|---|---|
| $d_1 = 8.12$ | | $n_1 = 1.72$ | $v_1 = 50.3$ |
| $r_2 = -188.77$ | | | |
| $d_2 = 2.54$ | | $n_2 = 1.72151$ | $v_2 = 29.2$ |
| $r_3 = 211.414$ | | | |
| $d_3 = D_1$ (variable) | | | |
| $r_4 = -88.728$ | | | |
| $d_4 = 2.01$ | | $n_3 = 1.72$ | $v_3 = 46.0$ |
| $r_5 = 32.722$ | | | |
| $d_5 = 5.1$ | | $n_4 = 1.80518$ | $v_4 = 25.4$ |
| $r_6 = 95.135$ | | | |
| $d_6 = D_2$ (variable) | | | |
| $r_7 = 66.387$ | | | |
| $d_7 = 1.46$ | | $n_5 = 1.7847$ | $v_5 = 26.2$ |
| $r_8 = 37.268$ | | | |
| $d_8 = 12.28$ | | $n_6 = 1.5112$ | $v_6 = 60.5$ |
| $r_9 = -67.633$ | | | |
| $d_9 = D_3$ (variable) | | | |
| $r_{10} = 87.09$ | | | |
| $d_{10} = 6.66$ | | $n_7 = 1.741$ | $v_7 = 52.7$ |
| $r_{11} = -126.453$ | | | |
| $d_{11} = 6.36$ | | | |
| $r_{12} = -40.681$ | | | |
| $d_{12} = 2.58$ | | $n_8 = 1.57501$ | $v_8 = 41.5$ |
| $r_{13} = 95.699$ | | | |
| $d_{13} = 5.36$ | | | |
| $r_{14} = -34.928$ | | | |
| $d_{14} = 4.49$ | | $n_9 = 1.757$ | $v_9 = 47.9$ |
| $r_{15} = -28.783$ | | | |

| F | $D_1$ | $D_2$ | $D_3$ |
|---|---|---|---|
| 102.43 | 4.856 | 39.398 | 3.793 |
| 147.68 | 25.178 | 19.076 | 24.115 |
| 193 | 39.773 | 4.481 | 38.71 |

| $F_{II} = -0.689F_W$ | $F_{III} = 0.831F_W$ |
|---|---|
| $r_{I-1} = 0.879F_W$ | $\|r_{II}\| = 0.866F_W$ |
| $\Delta \overline{N}_{II} + \Delta \overline{N}_{III} = 0.35878$ | $\Delta v_I = 21.1$ | wherein reference symbols $r_1$, $r_2$, ... respectively represent radii of curvature of respective lens surfaces, reference symbols $d_1$, $d_2$, ... respectively represent thicknesses of respective lenses and airspaces between respective lenses, reference symbols $n_1$, $n_2$, ... respectively represent refractive indices of respective lenses, reference symbols $v_1$, $v_2$, ... respectively represent Abbe's numbers of respective lenses, and reference symbol F represent the focal length of the lens system as a whole.

19. A bright and compact optical-compensation type zoom lens system according to claim 16, in which said zoom lens system having the following numerical data:

| $r_1 = 113.804$ | | | |
|---|---|---|---|
| $d_1 = 8.12$ | | $n_1 = 1.6935$ | $v_1 = 53.2$ |
| $r_2 = -112.521$ | | | |
| $d_2 = 2.54$ | | $n_2 = 1.6727$ | $v_2 = 32.1$ |
| $r_3 = 424.128$ | | | |
| $d_2 = D_1$ (variable) | | | |
| $r_4 = -87.131$ | | | |
| $d_4 = 2.01$ | | $n_3 = 1.72$ | $v_3 = 43.7$ |
| $r_5 = 29.983$ | | | |
| $d_5 = 5.73$ | | $n_4 = 1.7847$ | $v_4 = 26.2$ |
| $r_6 = 99.986$ | | | |
| $d_6 = D_2$ (variable) | | | |
| $r_7 = 64.722$ | | | |
| $d_7 = 1.46$ | | $n_5 = 1.72151$ | $v_5 = 29.2$ |
| $r_8 = 34.909$ | | | |
| $d_8 = 9$ | | $n_6 = 1.51112$ | $v_6 = 60.5$ |
| $r_9 = -74.582$ | | | |
| $d_9 = D_3$ (variable) | | | |
| $r_{10} = 68.175$ | | | |
| $d_{10} = 4.22$ | | $n_7 = 1.72916$ | $v_7 = 54.7$ |
| $r_{11} = -179.302$ | | | |
| $d_{11} = 7.03$ | | | |
| $r_{12} = -44.073$ | | | |
| $d_{12} = 1.74$ | | $n_8 = 1.57309$ | $v_8 = 42.6$ |
| $r_{13} = 65.55$ | | | |
| $d_{13} = 5.98$ | | | |
| $r_{14} = -38.983$ | | | |

-continued

| | | | |
|---|---|---|---|
| $d_{14} = 4.94$ | | $n_9 = 1.6935$ | $\nu_9 = 53.2$ |
| $r_{15} = -29.562$ | | | |

| F | $D_1$ | $D_2$ | $D_3$ |
|---|---|---|---|
| 102.43 | 7.055 | 40.819 | 4.362 |
| 147.68 | 27.377 | 20.497 | 24.684 |
| 193 | 41.972 | 5.902 | 39.279 |

$F_{II} = -0.689 F_W$  $F_{III} = 0.831 F_W$
$r_{I-1} = 1.111 F_W$  $|r_{II}| = 0.851 F_W$
$\Delta \overline{N}_{II} + \Delta \overline{N}_{III} = 0.27509$  $\Delta \nu_I = 21.1$ wherein reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, reference symbols $\nu_1, \nu_2, \ldots$ respectively represent Abbe's numbers of respective lenses, and reference symbol F represents the focal length of the lens system as a whole.

20. A bright and compact optical-compensation type zoom lens system according to claim 16, in which said zoom lens system having the following numerical data:

| | | | |
|---|---|---|---|
| $r_1 = 112.359$ | | | |
| $d_1 = 8.12$ | | $n_1 = 1.6935$ | $\nu_1 = 53.2$ |
| $r_2 = -112$ | | | |
| $d_2 = 2.54$ | | $n_2 = 1.68893$ | $\nu_2 = 31.1$ |
| $r_3 = 452.529$ | | | |
| $d_3 = D_1$ (variable) | | | |
| $r_4 = -93.072$ | | | |
| $d_4 = 2.01$ | | $n_3 = 1.72$ | $\nu_3 = 46$ |
| $r_5 = 30.606$ | | | |
| $d_5 = 5.29$ | | $n_4 = 1.80518$ | $\nu_4 = 25.4$ |
| $r_6 = 89.243$ | | | |
| $d_6 = D_2$ (variable) | | | |
| $r_7 = 62.002$ | | | |
| $d_7 = 1.46$ | | $n_5 = 1.7847$ | $\nu_5 = 26.2$ |
| $r_8 = 35.748$ | | | |
| $d_8 = 8.67$ | | $n_6 = 1.51112$ | $\nu_6 = 60.5$ |
| $r_9 = -73.57$ | | | |
| $d_9 = D_3$ (variable) | | | |
| $r_{10} = 58.62$ | | | |
| $d_{10} = 4.29$ | | $n_7 = 1.741$ | $\nu_7 = 52.7$ |
| $r_{11} = -450.663$ | | | |
| $d_{11} = 6.98$ | | | |
| $r_{12} = -52.901$ | | | |
| $d_{12} = 1.79$ | | $n_8 = 1.57501$ | $\nu_8 = 41.5$ |
| $r_{13} = 55.615$ | | | |
| $d_{13} = 6.1$ | | | |
| $r_{14} = -41.768$ | | | |
| $d_{14} = 5.36$ | | $n_9 = 1.757$ | $\nu_9 = 47.9$ |
| $r_{15} = -32.06$ | | | |

| F | $D_1$ | $D_2$ | $D_3$ |
|---|---|---|---|
| 102.43 | 6.883 | 41.409 | 3.978 |
| 147.68 | 27.205 | 21.087 | 24.3 |
| 193 | 41.8 | 6.492 | 38.895 |

$F_{II} = -0.689 F_W$  $F_{III} = 0.831 F_W$
$r_{I-1} = 1.097 F_W$  $|r_{II}| = 0.909 F_W$
$\Delta \overline{N}_{II} + \Delta \overline{N}_{III} = 0.35878$  $\Delta \nu_I = 21.1$ wherein reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, reference symbols $\nu_1, \nu_2, \ldots$ respectively represent Abbe's numbers of respective lenses, and reference symbol F represents the focal length of the lens system as a whole.

21. A bright and compact optical-compensation type zoom lens system according to claim 16, in which said zoom lens system having the following numerical data:

| | | | |
|---|---|---|---|
| $r_1 = 102.732$ | | | |
| $d_1 = 5.8$ | | $n_1 = 1.641$ | $\nu_1 = 56.9$ |
| $r_2 = -162.479$ | | | |
| $d_2 = 2.3$ | | $n_2 = 1.61293$ | $\nu_2 = 37$ |
| $r_3 = 361.524$ | | | |
| $d_3 = D_1$ (variable) | | | |
| $r_4 = -83.421$ | | | |
| $d_4 = 2.0$ | | $n_3 = 1.62012$ | $\nu_3 = 49.7$ |
| $r_5 = 32.836$ | | | |
| $d_5 = 4.0$ | | $n_4 = 1.76182$ | $\nu_4 = 26.6$ |
| $r_6 = 71.388$ | | | |
| $d_6 = D_2$ (variable) | | | |
| $r_7 = 121.646$ | | | |
| $d_7 = 2.1$ | | $n_5 = 1.69895$ | $\nu_5 = 30.1$ |
| $r_8 = 33.117$ | | | |
| $d_8 = 7.3$ | | $n_6 = 1.6583$ | $\nu_6 = 57.3$ |
| $r_9 = -88.167$ | | | |
| $d_9 = D_3$ (variable) | | | |
| $r_{10} = 53.895$ | | | |
| $d_{10} = 4.4$ | | $n_7 = 1.6485$ | $\nu_7 = 53$ |
| $r_{11} = 365.658$ | | | |
| $d_{11} = 6.5$ | | | |
| $r_{12} = -65.215$ | | | |
| $d_{12} = 2.5$ | | $n_8 = 1.57957$ | $\nu_8 = 53.8$ |
| $r_{13} = 71.468$ | | | |
| $d_{13} = 3.5$ | | | |
| $r_{14} = -77.557$ | | | |
| $d_{14} = 3.5$ | | $n_9 = 1.6485$ | $\nu_9 = 53$ |
| $r_{15} = -41.329$ | | | |

| F | $D_1$ | $D_2$ | $D_3$ |
|---|---|---|---|
| 103.21 | 5.861 | 38.303 | 7.685 |
| 150.42 | 26.861 | 17.303 | 28.685 |
| 193.98 | 40.861 | 3.303 | 42.685 |

$F_{II} = -0.696 F_W$  $F_{III} = 0.822 F_W$
$r_{I-1} = 0.995 F_W$  $|r_{II}| = 0.808 F_W$
$\Delta \overline{N}_{II} + \Delta \overline{N}_{III} = 0.18235$  $\Delta \nu_I = 19.9$ wherein reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, reference symbols $\nu_1, \nu_2, \ldots$ respectively represent Abbe's numbers of respective lenses, and reference symbol F represents the focal length of the lens system as a whole.

22. A bright and compact optical-compensation type zoom lens system according to claim 16, in which said zoom lens system having the following numerical data:

| | | | |
|---|---|---|---|
| $r_1 = 92.369$ | | | |
| $d_1 = 5.18$ | | $n_1 = 1.641$ | $\nu_1 = 56.9$ |
| $r_2 = -124.044$ | | | |
| $d_2 = 2.09$ | | $n_2 = 1.61293$ | $\nu_2 = 37$ |
| $r_3 = 319.244$ | | | |
| $d_3 = D_1$ (variable) | | | |
| $r_4 = -79.057$ | | | |
| $d_4 = 1.8$ | | $n_3 = 1.6825$ | $\nu_3 = 44.7$ |
| $r_5 = 31.23$ | | | |
| $d_5 = 4$ | | $n_4 = 1.80518$ | $\nu_4 = 25.4$ |
| $r_6 = 76.086$ | | | |
| $d_6 = D_2$ (variable) | | | |
| $r_7 = 116.231$ | | | |
| $d_7 = 1.89$ | | $n_5 = 1.74077$ | $\nu_5 = 27.8$ |
| $r_8 = 30.789$ | | | |
| $d_8 = 7.5$ | | $n_6 = 1.697$ | $\nu_6 = 48.5$ |

-continued

| | | | |
|---|---|---|---|
| $r_9 = -82.003$ | | | |
| $d_9 = D_3$ (variable) | | | |
| $r_{10} = 65.384$ | | | |
| $d_{10} = 6.4$ | | $n_7 = 1.6583$ | $\nu_7 = 53.4$ |
| $r_{11} = 560.402$ | | | |
| $d_{11} = 9.47$ | | | |
| $r_{12} = -58.027$ | | | |
| $d_{12} = 3.65$ | | $n_8 = 1.57135$ | $\nu_8 = 52.9$ |
| $r_{13} = 82.065$ | | | |
| $d_{13} = 4.5$ | | | |
| $r_{14} = -76.837$ | | | |
| $d_{14} = 4.5$ | | $n_9 = 1.6583$ | $\nu_9 = 57.3$ |
| $r_{15} = -41.224$ | | | |

| F | $D_1$ | $D_2$ | $D_3$ |
|---|---|---|---|
| 103.47 | 5.166 | 32.565 | 5.851 |
| 150.12 | 23.766 | 13.965 | 24.451 |
| 193 | 36.166 | 1.565 | 36.851 |

| | |
|---|---|
| $F_{II} = -0.625F_W$ | $F_{III} = 0.731F_W$ |
| $r_{I-1} = 0.893F_W$ | $|r_{III}| = 0.764F_W$ |
| $\Delta \overline{N}_{II} + \Delta \overline{N}_{III} = 0.16645$ | $\Delta \nu_I = 19.9$ | wherein reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, reference symbols $\nu_1, \nu_2, \ldots$ respectively represent Abbe's numbers of respective lenses, and reference symbol F represents the focal length of the lens system as a whole.

23. A bright and compact optical-compensation type zoom lens system according to claim 1, in which said first lens group I comprises a cemented doublet consisting of a positive lens element and negative lens element, said second lens group II comprises a cemented doublet consisting of a negative lens element and positive lens element, said third lens group III comprises a cemented doublet consisting of a negative lens element and positive lens element, and said fourth lens group IV comprises a positive lens component and negative lens component.

24. A bright and compact optical-compensation type zoom lens system according to claim 23, in which said zoom lens system having the following numerical data:

| | | | |
|---|---|---|---|
| $r_1 = 84.518$ | | | |
| $d_1 = 2.5$ | | $n_1 = 1.6398$ | $\nu_1 = 34.5$ |
| $r_2 = 46$ | | | |
| $d_2 = 5.74$ | | $n_2 = 1.641$ | $\nu_2 = 56.9$ |
| $r_3 = 198.951$ | | | |
| $d_3 = D_1$ (variable) | | | |
| $r_4 = -78.795$ | | | |
| $d_4 = 2.13$ | | $n_3 = 1.56883$ | $\nu_3 = 56.1$ |
| $r_5 = 36.692$ | | | |
| $d_5 = 4.27$ | | $n_4 = 1.78472$ | $\nu_4 = 25.7$ |
| $r_6 = 66.303$ | | | |
| $d_6 = D_2$ (variable) | | | |
| $r_7 = 170.898$ | | | |
| $d_7 = 2.67$ | | $n_5 = 1.72825$ | $\nu_5 = 28.5$ |
| $r_8 = 36.304$ | | | |
| $d_8 = 7.48$ | | $n_6 = 1.697$ | $\nu_6 = 48.5$ |
| $r_9 = -89.32$ | | | |
| $d_9 = D_3$ (variable) | | | |
| $r_{10} = 96.33$ | | | |
| $d_{10} = 4$ | | $n_7 = 1.6516$ | $\nu_7 = 58.7$ |
| $r_{11} = 249.545$ | | | |
| $d_{11} = 2.43$ | | | |
| $r_{12} = -135.661$ | | | |
| $d_{12} = 4$ | | $n_8 = 1.53256$ | $\nu_8 = 45.9$ |
| $r_{13} = -255.847$ | | | |

| F | $D_1$ | $D_2$ | $D_3$ |
|---|---|---|---|
| 103.28 | 4.908 | 43.74 | 8.179 |
| 150 | 26.961 | 21.687 | 30.232 |
| 193.59 | 41.761 | 6.887 | 45.032 |

| | |
|---|---|
| $F_{II} = -0.73F_W$ | $F_{III} = 0.877F_W$ |
| $r_{I-1} = 0.818F_W$ | $|r_{III}| = 0.763F_W$ |
| $\Delta \overline{N}_{II} + \Delta \overline{N}_{III} = 0.24714$ | $\Delta \nu_I = 22.4$ | wherein reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, reference symbols $\nu_1, \nu_2, \ldots$ respectively represent Abbe's numbers of respective lenses, and reference symbol F represents the focal length of the lens system as a whole.

25. A bright and compact optical-compensation type zoom lens system according to claim 23, in which said zoom lens system having the following numerical data:

| | | | |
|---|---|---|---|
| $r_1 = 84.075$ | | | |
| $d_1 = 6.2$ | | $n_1 = 1.641$ | $\nu_1 = 56.9$ |
| $r_2 = -170.085$ | | | |
| $d_2 = 2.3$ | | $n_2 = 1.61293$ | $\nu_2 = 37$ |
| $r_3 = 190.102$ | | | |
| $d_3 = D_1$ (variable) | | | |
| $r_4 = -75.21$ | | | |
| $d_4 = 2$ | | $n_3 = 1.57135$ | $\nu_3 = 52.9$ |
| $r_5 = 35.178$ | | | |
| $d_5 = 4$ | | $n_4 = 1.78472$ | $\nu_4 = 25.7$ |
| $r_6 = 64.055$ | | | |
| $d_6 = D_2$ (variable) | | | |
| $r_7 = 148.889$ | | | |
| $d_7 = 2.2$ | | $n_5 = 1.7285$ | $\nu_5 = 28.5$ |
| $r_8 = 34.759$ | | | |
| $d_8 = 7.5$ | | $n_6 = 1.697$ | $\nu_6 = 48.5$ |
| $r_9 = -90.578$ | | | |
| $d_9 = D_3$ (variable) | | | |
| $r_{10} = 108.982$ | | | |
| $d_{10} = 3$ | | $n_7 = 1.691$ | $\nu_7 = 54.8$ |
| $r_{11} = 417.251$ | | | |
| $d_{11} = 1.97$ | | | |
| $r_{12} = -135.649$ | | | |
| $d_{12} = 4.2$ | | $n_8 = 1.53172$ | $\nu_8 = 48.9$ |
| $r_{13} = -368.112$ | | | |

| F | $D_1$ | $D_2$ | $D_3$ |
|---|---|---|---|
| 103.45 | 5.595 | 42.225 | 12.463 |
| 149.94 | 26.582 | 21.238 | 33.45 |
| 193 | 40.615 | 7.205 | 47.483 |

| | |
|---|---|
| $F_{II} = -0.696F_W$ | $F_{III} = 0.84F_W$ |
| $r_{I-1} = 0.813F_W$ | $|r_{III}| = 0.727F_W$ |
| $\Delta \overline{N}_{II} + \Delta \overline{N}_{III} = 0.24462$ | $\Delta \nu_I = 19.9$ | wherein reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, reference symbols $\nu_1, \nu_2, \ldots$ respectively represent Abbe's numbers of respective lenses, and reference symbol F represents the focal length of the lens system as a whole.

* * * * *